US012764769B2

(12) United States Patent
Monteiro et al.

(10) Patent No.: US 12,764,769 B2
(45) Date of Patent: Oct. 13, 2026

(54) METHODS AND APPARATUS RELATING TO FULL DUPLEX COMMUNICATIONS

(71) Applicant: Telefonaktiebolaget LM Ericsson (publ), Stockholm (SE)

(72) Inventors: Victor Farias Monteiro, Fortaleza (BR); Francisco Rafael Marques Lima, Sobral (BR); Iran Mesquita Braga Junior, Fortaleza (BR); Tarcísio Ferreira Maciel, Fortaleza-Ceará (BR); Gabor Fodor, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 281 days.

(21) Appl. No.: 18/564,056

(22) PCT Filed: May 26, 2021

(86) PCT No.: PCT/EP2021/064117
§ 371 (c)(1),
(2) Date: Nov. 24, 2023

(87) PCT Pub. No.: WO2022/248041
PCT Pub. Date: Dec. 1, 2022

(65) Prior Publication Data

US 2024/0260065 A1 Aug. 1, 2024

(51) Int. Cl.
*H04W 72/40* (2023.01)
*H04L 5/14* (2006.01)
(Continued)

(52) U.S. Cl.
CPC ............... *H04W 72/40* (2023.01); *H04L 5/14* (2013.01); *H04W 48/16* (2013.01); *H04W 72/542* (2023.01)

(58) Field of Classification Search
CPC . H04W 72/40; H04W 72/541; H04W 72/542; H04W 24/08; H04L 5/14
See application file for complete search history.

(56) References Cited

U.S. PATENT DOCUMENTS 9,420,606 B2 * 8/2016 Bhushan ............... H04W 24/08
9,504,048 B2 11/2016 Cheng et al.
(Continued)

FOREIGN PATENT DOCUMENTS

WO 2020132284 A1 6/2020
WO 2020249229 A1 12/2020

OTHER PUBLICATIONS

PCT International Search Report, mailed Apr. 20, 2022, in connection with International Application No. PCT/EP2021/064117, all pages.
PCT Written Opinion, mailed Apr. 20, 2022, in connection with International Application No. PCT/EP2021/064117, all pages.

*Primary Examiner* — Shukri Taha
(74) *Attorney, Agent, or Firm* — Weisberg I.P. Law, P.A.

(57) ABSTRACT

According to an aspect there is provided a method in a base station that is to operate in a full duplex communication mode. The method comprises sending respective device-to-device, D2D, announcement configurations to one or more first wireless devices that have data to transmit to the base station. A D2D announcement configuration configures a first wireless device to perform a respective D2D announcement. The method also comprises sending a D2D announcement monitoring configuration to one or more second wireless devices that the base station has data to transmit to. A D2D announcement monitoring configuration configures a second wireless device to monitor for a D2D announcement transmitted by one or more first wireless devices. Next, the method comprises determining information relating to receipt of D2D announcements by the one or more second wireless devices according to the D2D announcement moni-
(Continued)

toring configuration, and identifying, based on the determined information, an uplink, UL, wireless device from the one or more first wireless devices and a downlink, DL, wireless device from the one or more second wireless devices for a full duplex communication in which the UL wireless device is to transmit data to the base station and the base station is to transmit data to the DL wireless device.

22 Claims, 14 Drawing Sheets

(51) Int. Cl.
*H04W 48/16* (2009.01)
*H04W 72/542* (2023.01)

(56) References Cited

U.S. PATENT DOCUMENTS

| | | | |
|---|---|---|---|
| 10,256,864 | B2 | 4/2019 | Eltawil et al. |
| 2014/0169234 | A1 | 6/2014 | Zhu et al. |
| 2015/0055515 | A1 | 2/2015 | Cheng et al. |
| 2015/0382375 | A1 | 12/2015 | Bhushan et al. |
| 2017/0054544 | A1 | 2/2017 | Kazmi et al. |
| 2017/0257184 | A1 | 9/2017 | Stirling-Gallacher et al. |
| 2018/0167832 | A1 | 6/2018 | Fang et al. |
| 2019/0349945 | A1* | 11/2019 | Yeh ........................ H04L 5/0073 |
| 2020/0145175 | A1* | 5/2020 | Hassan Hussein . H04W 72/541 |
| 2021/0067992 | A1* | 3/2021 | Kusashima ........... H04W 24/08 |
| 2021/0345374 | A1* | 11/2021 | Abotabl .................... H04L 5/14 |

* cited by examiner

METHODS AND APPARATUS RELATING TO FULL DUPLEX COMMUNICATIONS

TECHNICAL FIELD

This disclosure relates to full duplex communications, and in particular to methods, computer program products and apparatus for enabling full duplex communications.

BACKGROUND

Frequency division duplexing (FDD) and time division duplexing (TDD) methods are needed in order to prevent a fundamental drawback in wireless communications, namely that a transceiver cannot properly decode an incoming (receiving) signal in a given frequency channel if the transceiver is also transmitting on the same frequency channel at the same time. In this case, the transmit signal acts as a strong interfering source to the received signal. This is referred to as self-interference (SI). However, recent breakthroughs in hardware and signal processing have made possible the attenuation of SI by up to 100 dB by using antenna arrangements, as well as signal processing at both analog and digital domains. These recent breakthroughs have allowed the so-called full duplex (FD) communication, i.e., transmitting and receiving data at the same time and on same frequency channel. In theory, FD communication is capable of doubling the spectral efficiency of current FDD/TDD-based communications.

Full duplex spectral efficiency gains can be obtained in point to multipoint communications even when only the base station (BS) is FD-capable, while the user equipments (UEs) operate in half duplex (HD) mode. In this three-node FD scheme, the FD-capable BS can transmit to a given UE, referred to herein as the downlink (DL) UE, while it can receive a signal from another UE, referred to herein as the uplink (UL) UE. This is an appealing scenario since one can keep cost-effective hardware and processing capabilities on the UE side. However, besides SI that should be mitigated at the BS, the UL UE can act as an interference source to the link between the BS and DL UE. This interfering signal (sometimes called the UE-to-UE interference), is referred to herein as the co-channel interference (CCI). It should be noted that co-channel interference arises in single cell scenarios and becomes even more severe in multi-cell scenarios.

CCI in three-node FD can be attenuated by a suitable choice of DL and UL UEs, a task referred to herein as UE pairing, as well as by UL transmit power control and modulation and coding scheme (MCS) selection. Basically, by pairing DL and UL UEs that are far away from each other, the CCI can be strongly attenuated, even when operating in 3-node FD mode, by the increased path loss between these UEs.

FIG. 1 illustrates the basics of UE pairing in a point-to-multipoint scenario with a FD BS 101 and UEs 102 operating in HD mode. FIG. 1 presents two scenarios. In the first scenario, the BS 101 has chosen as the UE pair DL UE 1 and UL UE 1 whose involved links are shown by solid arrows as well as the SI link with dotted arrow. In the second scenario, the selected UE pair is DL UE 2 and UL UE 2 where the involved links are shown by dashed arrows as well as SI link with dotted arrow. As discussed above, DL UE 1 in the first scenario will suffer from high CCI from UL UE1 due to the short distance between these two UEs. As a consequence, the experienced signal to noise plus interference ratio (SINR) will be low, leading to poor transmit data rates. On the other hand, in the second scenario, DL UE 2 and UL UE 2 are more distant from each other, leading to a higher path loss between them. In this case, DL UE 2 will perceive a much lower CCI and SINR tends to be greater than in scenario 1.

US patent application no. US 2015/0055515 describes methods and apparatus for handling FD interference in a point-to-multipoint communication between a BS and several UEs. Based on interference measurements reported by UEs, the BS can determine which pairs of UEs are more suitable for engaging in FD transmissions. The UEs may use short distance communications, e.g., WiFi, Bluetooth, etc., to discover the neighbour UEs and report this information to the BS.

In U.S. Pat. No. 9,420,606 it is assumed that a FD BS and HD UEs take part in a point-to-multipoint FD communication. This patent provides various methods by which a BS may choose UEs to be co-scheduled based, for example, on the path loss between the respective UEs. Several methods are proposed to estimate inter-UE path loss. In one method, path loss between UEs may be estimated through the use of pilot signals transmitted by, for example, half of the UEs on specific frequency resources determined by the BS in a discovery time slot. In another method, the path loss is estimated based on geographical position obtained by, e.g., GPS, and fed back to the BS that in its turn evaluates the inter-UE distance.

In US patent application no. US 2014/0169234 a method is provided for each UE to estimate a list of neighbour UEs. Each UE reports its neighbour list to the BS, and the BS builds a master neighbour list. Based on the master neighbour list, the BS can take scheduling decisions in FD networks. Alternatively, the neighbour list can be determined based on the geographical position of each UE.

In each of the above disclosures, the UEs are to provide the BS with information by means of messages in control channels, such as inter-UE path loss, geographical location or neighbour lists, so as to support UE pairing. Furthermore, in some of these methods, UEs are to transmit reference signals in order for other UEs to estimate CCI, thus consuming precious radio resources.

The 3rd Generation Partnership Project (3GPP) standards allow for the direct communication between UEs. This direct communication is known as Sidelink (SL) communication, or more broadly as device-to-device (D2D) communication. Sidelink communication is supported by Proximity Services (ProSe) features, which are defined in the 3GPP standard TS 23.303. ProSe features consist of: ProSe Discovery and ProSe Direct Communication.

As defined in section 5.3.1.2 of 3GPP TS 23.303 v15.1.0, there are two models for ProSe Discovery:

Model A ("I am here")

This model defines two roles for the ProSe-enabled UEs that are participating in ProSe Direct Discovery.

- Announcing UE: The UE announces certain information that could be used by UEs in proximity that have permission to discover.
- Monitoring UE: The UE that monitors certain information of interest in proximity of announcing UEs.

-continued

In this model the announcing UE broadcasts discovery messages at pre-defined discovery intervals and the monitoring UEs that are interested in these messages read them and process them.
NOTE: This model is equivalent to "I am here" since the announcing UE would broadcast information about itself e.g., its ProSe Application Code in the discovery message.
[...]
Model B ("who is there?" / "are you there?")
This model when restricted discovery type is used, defines two roles for the ProSe-enabled UEs that are participating in ProSe Direct Discovery.
- Discoverer UE: The UE transmits a request containing certain information about what it is interested to discover.
- Discoveree UE: The UE that receives the request message can respond with some information related to the discoverer's request.

It is equivalent to " who is there/are you there" since the discoverer UE sends information about other UEs that would like to receive responses from, e.g. the information can be about a ProSe Application Identity corresponding to a group and the members of the group can respond.
Regarding the radio resources used in the ProSe discovery procedure, two modes are defined in section 23.11.3 of 3GPP TS 36.300 v16.1.0:
- UE autonomous resource selection: A resource allocation procedure where resources for announcing of discovery message are allocated on a non UE specific basis, further characterized by:
  - The eNB provides the UE(s) with the resource pool configuration used for announcing of discovery message. The configuration may be signalled in broadcast or dedicated signalling;
  - The UE autonomously selects radio resource(s) from the indicated resource pool and announces discovery message;
  - The UE can announce discovery message on a randomly selected discovery resource during each discovery period.
- Scheduled resource allocation: A resource allocation procedure where resources for announcing of discovery message are allocated on per UE specific basis, further characterized by:
- The UE in RRC_CONNECTED may request resource(s) for announcing of discovery message from the eNB via RRC;
- The eNB assigns resource(s) via RRC;
- The resources are allocated within the resource pool that is configured in UEs for announcement.

SUMMARY

Considering 3GPP wireless networks, e.g., Long Term Evolution (LTE) and New Radio (NR), in order to identify neighbours for UE pairing in FD scenarios, prior art solutions either use alternative technologies in different spectrum bands, e.g., unlicensed spectrum, such as Bluetooth and WiFi Direct, such as in US 2015/0055515, or use the network operator's own resources to exchange control signalling to identify neighbours, as discussed in U.S. Pat. No. 9,420,606 and US 2014/0169234.

FIG. 2(*a*) illustrates the solutions that use alternative technologies for neighbouring UE 202 detection, e.g. using WiFi or Bluetooth, without there being the possibility for interference control by the BS 201. On the one hand, these solutions are subject to uncontrolled interference from devices 203 operating in the shared spectrum. Since these devices 203 may use technologies different from the 3GPP ones, e.g., WiFi, a 3GPP BS 201 or UE 202 might not be able to control the generated/received interference by 3GPP devices 202 to/from other non-3GPP devices 203. The dashed arrows illustrate the peer discovery with the 3GPP UEs 202, while the dotted arrows illustrate the interference from the non-3GPP devices 203 to the 3GPP UEs 202. Moreover, the use of other non-3GPP networks and spectrum bands for UE neighbour identification might not provide reliable information about UE neighbours in 3GPP spectrum bands, since 3GPP employs a wide range of spectrum bands. The solid arrow represents the neighbour report sent from a UE 202 to the BS 201.

FIG. 2(*b*) illustrates the solutions where neighbour detection is independent of whether the UEs 212 have data to transmit or receive, leading to a waste of resources. Thus, all UEs 212 take part in the peer discovery process independent of their buffer status (or whether the BS 211 has data to transmit to the UE 212). UEs 212 with no data to transmit are shown as boxes with dashed lines, and those UEs 212 with data to transmit are shown as boxes with solid lines. The solid two-way arrow represents the pilot transmission by the UEs 212, and the feedback received on the pilot transmission. The solid single-way arrow represents the neighbour report sent from a UE 212 to the BS 211. Thus, there is a waste of resources, decreasing the amount of resources available to transmit data traffic.

The effectiveness of interference mitigation that can be achieved by proper UE pairing and resource allocation depends on the success of the peer discovery (UE pairing) process, since they are intrinsically connected.

Thus, there is a need for improvements in the pairing of UEs, or more generally "wireless devices", for full duplex communications by a base station.

According to a first aspect disclosed herein, there is provided a method in a base station that is to operate in a full duplex communication mode. The method comprises sending respective D2D announcement configurations to one or more first wireless devices that have data to transmit to the base station, where a D2D announcement configuration configures a first wireless device to perform a respective D2D announcement; sending a D2D announcement monitoring configuration to one or more second wireless devices that the base station has data to transmit to, where a D2D announcement monitoring configuration configures a second wireless device to monitor for a D2D announcement transmitted by one or more first wireless devices; determining information relating to receipt of D2D announcements by the one or more second wireless devices according to the D2D announcement monitoring configuration; and identifying, based on the determined information, an UL wireless device from the one or more first wireless devices and a DL wireless device from the one or more second wireless devices for a full duplex communication in which the UL wireless device is to transmit data to the base station and the base station is to transmit data to the DL wireless device.

According to a second aspect, there is provided a method in a first wireless device. The method comprises sending an indication to a base station that the first wireless device has data to transmit to the base station; receiving a D2D announcement configuration from the base station, wherein the D2D announcement configuration configures the first wireless device to perform a D2D announcement; and transmitting one or more D2D announcements according to the received D2D announcement configuration.

According to a third aspect, there is provided a method in a second wireless device. The method comprises receiving a D2D announcement monitoring configuration from a base station, where the D2D announcement monitoring configuration configures the second wireless device to monitor for a D2D announcement by one or more first wireless devices; monitoring for a D2D announcement by the one or more first wireless devices according to the received D2D announcement monitoring configuration; and providing information to the base station, wherein the information relates to receipt of D2D announcements by the second wireless device according to the received D2D announcement monitoring configuration.

According to a fourth aspect, there is provided a method in a base station for scheduling resources for a full duplex communication in which an UL wireless device is to transmit data to the base station and the base station is to transmit data to a DL wireless device. The method comprises determining one or both of: respective channel quality indicator, CQI, for communications from the UL wireless device to the base station for a plurality of available resources; and CQI for communications from the base station to the DL wireless device for the plurality of available resources; and scheduling the N resources with the highest channel quality for the full duplex communication according to the determined CQIs, wherein N is the number of resources required for the full duplex communication.

According to a fifth aspect, there is provided a computer program product comprising a computer readable medium having computer readable code embodied therein, the computer readable code being configured such that, on execution by a suitable computer or processor, the computer or processor is caused to perform the method according to the first aspect, the second aspect, the third aspect, the fourth aspect, or any embodiments thereof.

According to a sixth aspect, there is provided a base station that is configured to operate in a full duplex communication mode. The base station is configured to send respective D2D announcement configurations to one or more first wireless devices that have data to transmit to the base station, where a D2D announcement configuration configures a first wireless device to perform a respective D2D announcement; send a D2D announcement monitoring configuration to one or more second wireless devices that the base station has data to transmit to, where a D2D announcement monitoring configuration configures a second wireless device to monitor for a D2D announcement transmitted by one or more first wireless devices; determine information relating to receipt of D2D announcements by the one or more second wireless devices according to the D2D announcement monitoring configuration; and identify, based on the determined information, an UL wireless device from the one or more first wireless devices and a DL wireless device from the one or more second wireless devices for a full duplex communication in which the UL wireless device is to transmit data to the base station and the base station is to transmit data to the DL wireless device.

According to a seventh aspect, there is provided a first wireless device. The first wireless device is configured to send an indication to a base station that the first wireless device has data to transmit to the base station; receive a D2D announcement configuration from the base station, wherein the D2D announcement configuration configures the first wireless device to perform a D2D announcement; and transmit one or more D2D announcements according to the received D2D announcement configuration.

According to an eighth aspect, there is provided a second wireless device. The second wireless device is configured to receive a D2D announcement monitoring configuration from a base station, where the D2D announcement monitoring configuration configures the second wireless device to monitor for a D2D announcement by one or more first wireless devices; monitor for a D2D announcement by the one or more first wireless devices according to the received D2D announcement monitoring configuration; and provide information to the base station, wherein the information relates to receipt of D2D announcements by the second wireless device according to the received D2D announcement monitoring configuration.

According to a ninth aspect, there is provided a base station configured to schedule resources for a full duplex communication in which an UL wireless device is to transmit data to the base station and the base station is to transmit data to a DL wireless device. The base station is configured to determine one or both of: respective channel quality indicator, CQI, for communications from the UL wireless device to the base station for a plurality of available resources; and CQI for communications from the base station to the DL wireless device for the plurality of available resources; and schedule the N resources with the highest channel quality for the full duplex communication according to the determined CQIs, wherein N is the number of resources required for the full duplex communication.

According to a tenth aspect, there is provided a base station that is configured to operate in a full duplex communication mode. The base station comprises a processor and a memory, said memory containing instructions executable by said processor whereby said base station is operative to send respective D2D announcement configurations to one or more first wireless devices that have data to transmit to the base station, where a D2D announcement configuration configures a first wireless device to perform a respective D2D announcement; send a D2D announcement monitoring configuration to one or more second wireless devices that the base station has data to transmit to, where a D2D announcement monitoring configuration configures a second wireless device to monitor for a D2D announcement transmitted by one or more first wireless devices; determine information relating to receipt of D2D announcements by the one or more second wireless devices according to the D2D announcement monitoring configuration; and identify, based on the determined information, an UL wireless device from the one or more first wireless devices and a DL wireless device from the one or more second wireless devices for a full duplex communication in which the UL wireless device is to transmit data to the base station and the base station is to transmit data to the DL wireless device.

According to an eleventh aspect, there is provided a first wireless device. The first wireless device comprises a processor and a memory, said memory containing instructions executable by said processor whereby said first wireless device is operative to send an indication to a base station that the first wireless device has data to transmit to the base station; receive a D2D announcement configuration from the base station, wherein the D2D announcement configuration configures the first wireless device to perform a D2D announcement; and transmit one or more D2D announcements according to the received D2D announcement configuration.

According to a twelfth aspect, there is provided a second wireless device. The second wireless device comprises a processor and a memory, said memory containing instructions executable by said processor whereby said second wireless device is operative to receive a D2D announcement monitoring configuration from a base station, where the D2D announcement monitoring configuration configures the second wireless device to monitor for a D2D announcement by one or more first wireless devices; monitor for a D2D announcement by the one or more first wireless devices according to the received D2D announcement monitoring configuration; and provide information to the base station, wherein the information relates to receipt of D2D announcements by the second wireless device according to the received D2D announcement monitoring configuration.

According to a thirteenth aspect, there is provided a base station operative to schedule resources for a full duplex communication in which an UL wireless device is to transmit data to the base station and the base station is to transmit data to a DL wireless device. The base station comprises a processor and a memory, said memory containing instructions executable by said processor whereby said base station is operative to determine one or both of: respective channel quality indicator, CQI, for communications from the UL wireless device to the base station for a plurality of available resources; and CQI for communications from the base station to the DL wireless device for the plurality of available resources; and schedule the N resources with the highest channel quality for the full duplex communication according to the determined CQIs, wherein N is the number of resources required for the full duplex communication.

Certain embodiments may provide one or more of the following technical advantage(s). The solutions proposed above thus provide new methods for pairing wireless devices for full duplex communications with a base station. These solutions can result in pairings with low interference, and are based on a D2D announcement (e.g. a sidelink announcement), which is achieved with reduced signalling compared to existing techniques.

In particular, the disclosed techniques provide reduced signalling compared to conventional solutions based on neighbour identification, since the wireless devices with data to transmit perform a D2D announcement, and wireless devices with data to receive monitor for the D2D announcements. In some embodiments, only the wireless devices with data to transmit perform the D2D announcements. In some embodiments, only the wireless devices with data to receive from the base station monitor for the D2D announcements.

When applied to 3GPP communication networks, the reduction in interference in the wireless device pairing can be provided by the pairing process making use of 3GPP concepts instead of any other (non-3GPP) peer discovery technology, such as WiFi and Bluetooth.

BRIEF DESCRIPTION OF DRAWINGS

Examples of the proposed technology will now be described in more detail and with reference to the accompanying drawings of which.

DETAILED DESCRIPTION

Briefly, according to embodiments of the techniques described herein, instead of all the wireless devices trying to identify which wireless devices are their neighbours (and thus may interfere with full duplex communications by the base station), when a wireless device has data to transmit, it informs the network, e.g., the base station. The base station will then request the wireless device to perform a D2D announcement, as described further below. Then, the base station notifies and configures wireless devices that have data to receive from the network to monitor the D2D announcement(s). Wireless devices provide information to the base station relating to whether the respective wireless device detected the D2D announcement(s). Based on this information, the base station determines which wireless devices can transmit without causing interference to other wireless devices, and the base station will schedule one or more 'UL wireless devices' and one or more 'DL wireless devices' for the full duplex communications that do not interfere, or do not substantially interfere, with each other. For example, a UL UE 'a' and DL UE 'b' can be selected for full duplex communications, where DL UE 'b' did not detect the D2D announcement of UL UE 'a', or DL UE 'b' detected the D2D announcement but the channel quality of the D2D announcement is lower than a given threshold. In various embodiments, the base station can perform a wireless device pairing and resource allocation procedure that is enabled by the aforementioned signalling scheme for peer discovery. The base station can perform wireless device pairing and resource allocation based on any of quality of service (QOS)

requirements, satisfaction criteria, buffer status, or other relevant information from the wireless device side.

In the following, a wireless device that is selected/scheduled to transmit data to the base station while the base station transmits data to another wireless device is referred to as an "UL wireless device" or "UL UE". The wireless device that is selected/scheduled to receive data from the base station while the base station receives data from an UL wireless device is referred to as a "DL wireless device" or "DL UE". The techniques described herein therefore aim to identify one or more UL wireless devices for full duplex communications from a set of wireless devices that have data to transmit to the base station, and to identify one or more DL wireless devices for the full duplex communications from a set of wireless devices that the base station has data to transmit to.

Figure 1:
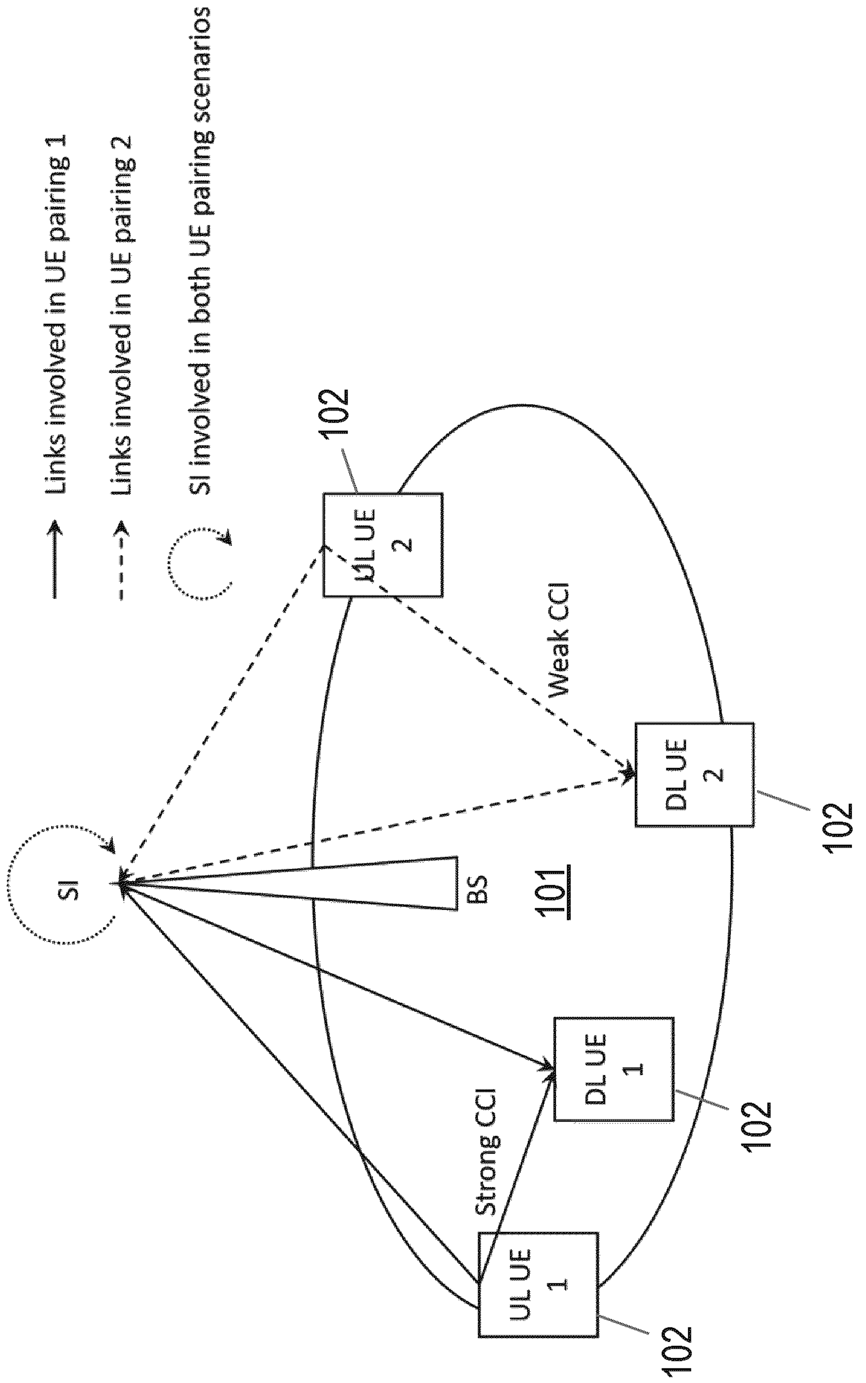
FIG. 1 is an illustration of two UE pairing scenarios for full duplex communications by a base station.
Figure 2:
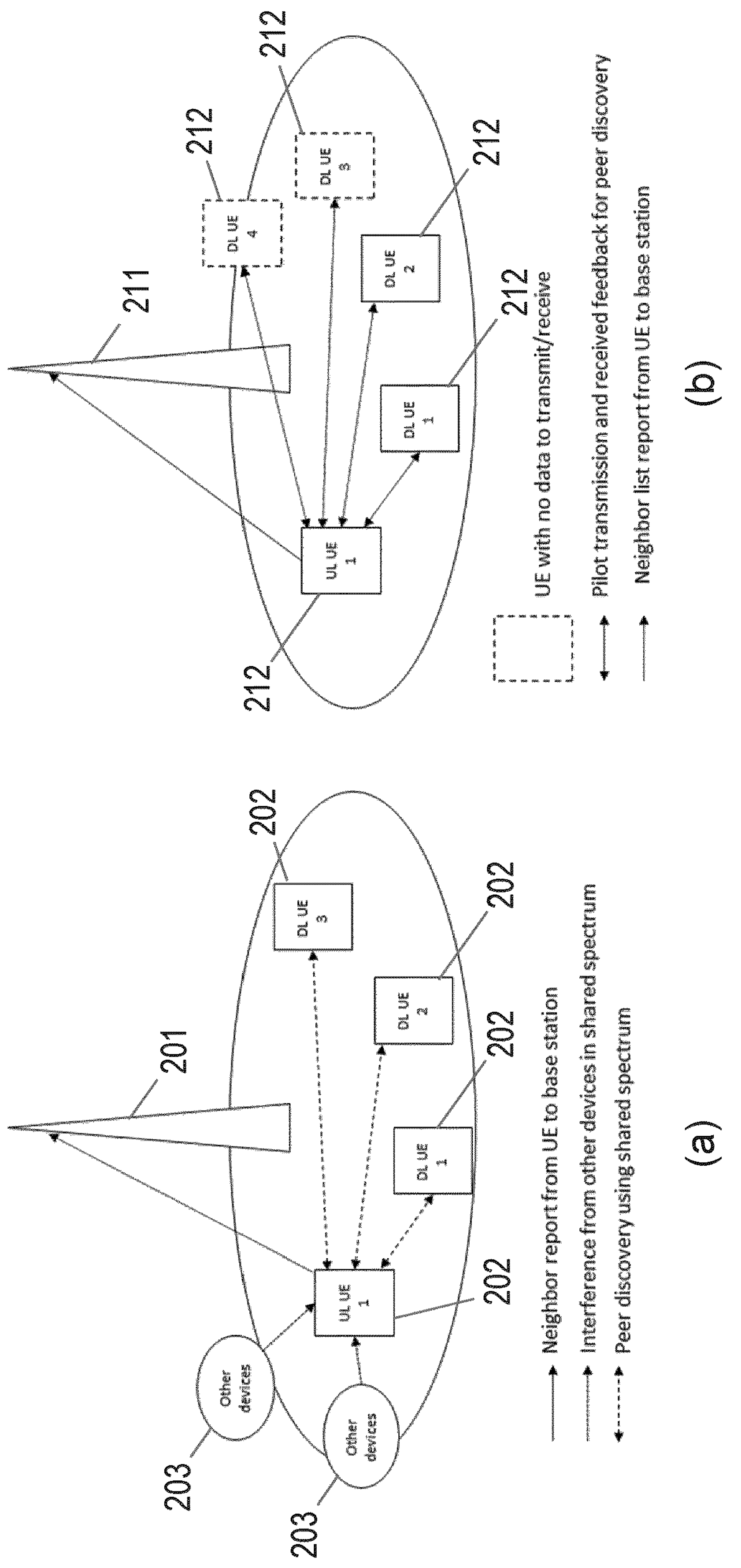
FIGS. 2(*a*) and (*b*) illustrate conventional techniques for UE pairing.
Figure 3:
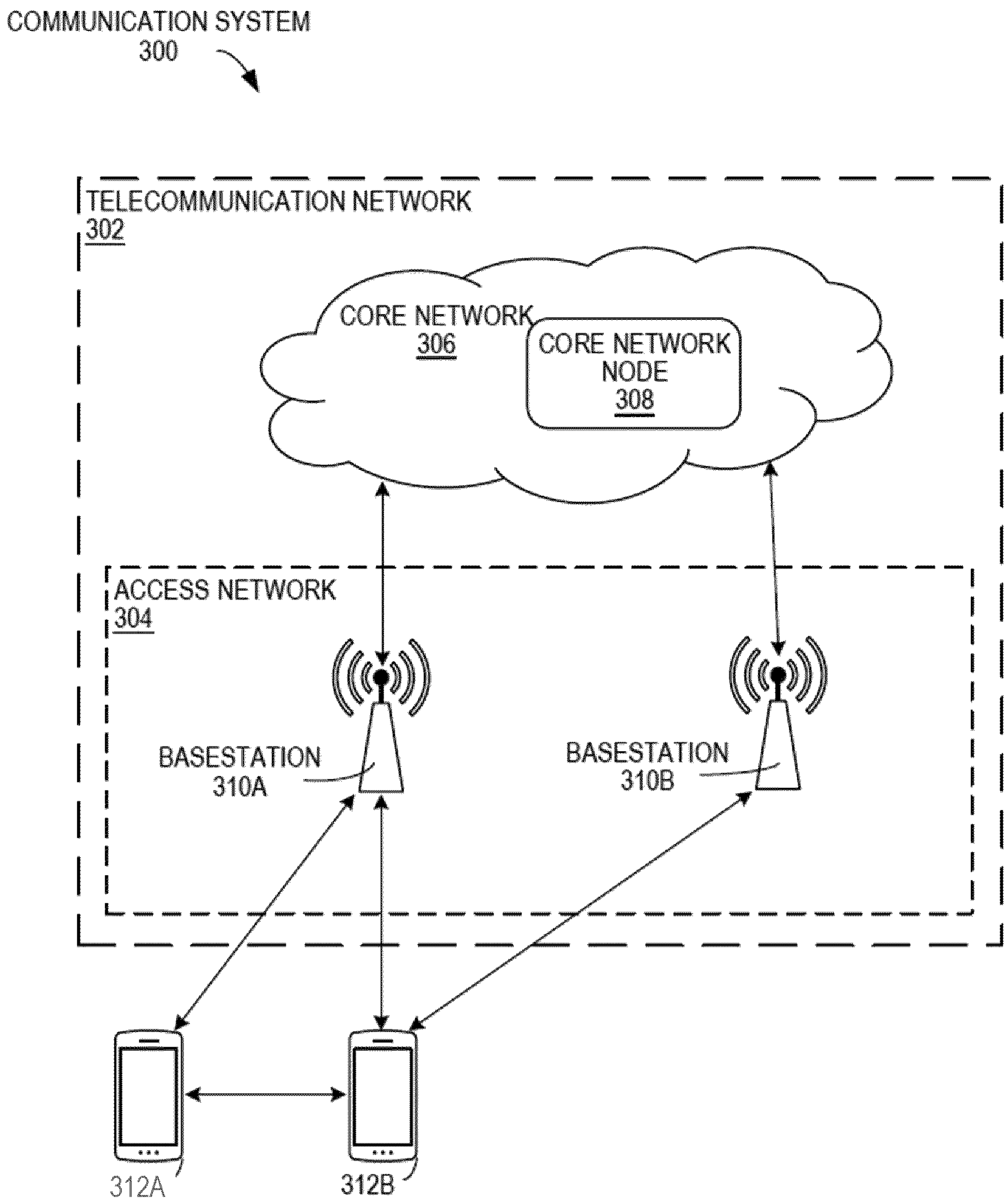
FIG. 3 is an example of a communication system in which the techniques described herein can be applied.

FIG. 3 shows an example of a communication system 300 in which the techniques described herein can be applied.

In the example, the communication system 300 includes a telecommunication network 302 that includes an access network 304, such as a radio access network (RAN), and a core network 306, which includes one or more core network nodes 308. The access network 304 includes one or more access network nodes, such as base stations 310*a* and 310*b* (one or more of which are also interchangeably referred to as "network nodes 310"), or any other similar 3$^{rd}$ Generation Partnership Project (3GPP) access node or non-3GPP access point. The base stations 310 facilitate direct or indirect connection of wireless devices (also referred to interchangeably herein as "user equipment" or "UE"), such as by connecting UEs 312*a* and 312*b* (one or more of which may be generally referred to as UEs 312) to the core network 306 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 300 may include any number of wired or wireless networks, network nodes, UEs, and/or any other components or systems that may facilitate or participate in the communication of data and/or signals whether via wired or wireless connections. The communication system 300 may include and/or interface with any type of communication, telecommunication, data, cellular, radio network, and/or other similar type of system.

The UEs 312 may be any of a wide variety of communication devices, including wireless devices arranged, configured, and/or operable to communicate wirelessly with the base stations 310 and other communication devices. Similarly, the base stations 310 are arranged, capable, configured, and/or operable to communicate directly or indirectly with the UEs 312 and/or with other network nodes or equipment in the telecommunication network 302 to enable and/or provide network access, such as wireless network access, and/or to perform other functions, such as administration in the telecommunication network 302.

The core network 306 includes one more core network nodes (e.g., core network node 308) that are structured with hardware and software components. Features of these components may be substantially similar to those described with respect to the UEs and/or base stations, such that the descriptions thereof are generally applicable to the corresponding components of the core network node 308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

As a whole, the communication system 300 of FIG. 3 enables connectivity between the UEs and network nodes. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), New Radio (NR) and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 302 is a cellular network that implements 3GPP standardized features. Accordingly, the telecommunications network 302 may support network slicing to provide different logical networks to different devices that are connected to the telecommunication network 302. For example, the telecommunications network 302 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 312 are configured to transmit and/or receive information without direct human interaction. For instance, a UE may be designed to transmit information to the access network 304 on a predetermined schedule, when triggered by an internal or external event, or in response to requests from the access network 304. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

Figure 4:
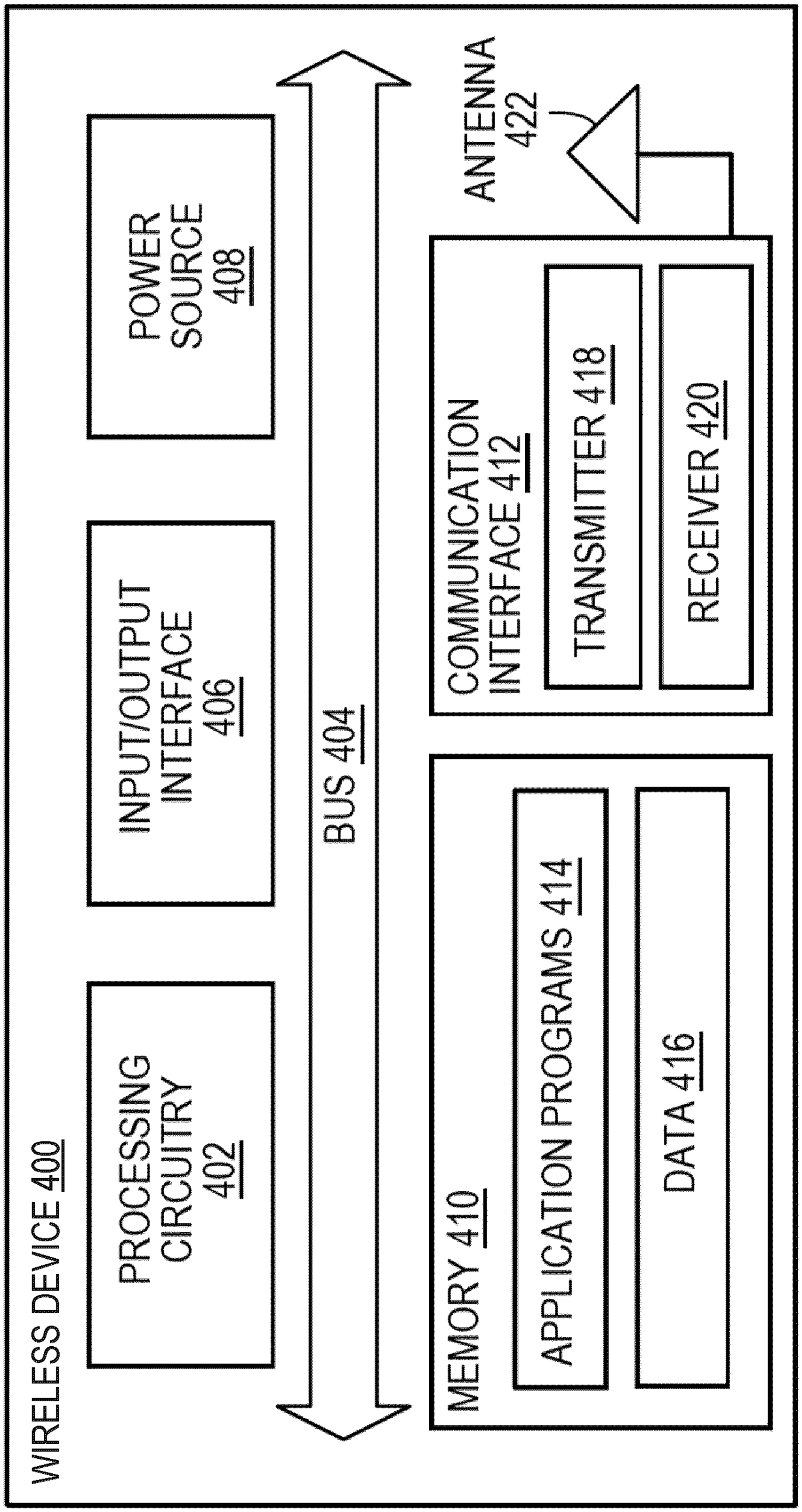
FIG. 4 shows a wireless device in accordance with some embodiments.

FIG. 4 shows a wireless device 400 in accordance with some embodiments. The wireless device 400 is also referred to interchangeably as UE 400. As used herein, the term 'wireless device' or 'UE' refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3$^{rd}$ Generation Partnership Project (3GPP), including a narrow band internet of things (NB-IoT) UE, a machine type communication (MTC) UE, and/or an enhanced MTC (eMTC) UE.

The UE 400 supports device-to-device (D2D) communication, for example by implementing a 3GPP standard for sidelink (SL) communication, Dedicated Short-Range Communication (DSRC), vehicle-to-vehicle (V2V), vehicle-to-infrastructure (V2I), or vehicle-to-everything (V2X).

In some examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 400 includes processing circuitry 402 that is operatively coupled via a bus 404 to an input/output interface 406, a power source 408, a memory 410, a communication interface 412, and/or any other component, or any combination thereof. Certain UEs may utilize all or a subset of the components shown in FIG. 4. The level of integration between the components may vary from one UE to another UE. Further, certain UEs may contain multiple instances of a component, such as multiple processors, memories, transceivers, transmitters, receivers, etc.

The processing circuitry 402 is configured to process instructions and data and may be configured to implement any sequential state machine operative to execute instructions stored as machine-readable computer programs in the memory 410. The processing circuitry 402 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 402 may include multiple central processing units (CPUs). The processing circuitry 402 may be operable to provide, either alone or in conjunction with other UE 400 components, such as the memory 410, to provide UE 400 functionality. For example, the processing circuitry 402 may be configured to cause the UE 400 to perform any of the methods described herein, and for example to perform the methods described below with reference to FIGS. 11 and/or 12.

In the example, the input/output interface 406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 408 is structured as a battery or battery pack. Other types of power sources, such as an external power source (e.g., an electricity outlet), photovoltaic device, or power cell, may be used. The power source 408 may further include power circuitry for delivering power from the power source 408 itself, and/or an external power source, to the various parts of the UE 400 via input circuitry or an interface such as an electrical power cable. Delivering power may be, for example, for charging of the power source 408. Power circuitry may perform any formatting, converting, or other modification to the power from the power source 408 to make the power suitable for the respective components of the UE 400 to which power is supplied.

The memory 410 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 410 includes one or more application programs 414, such as an operating system, web browser application, a widget, gadget engine, or other application, and corresponding data 416. The memory 410 may store, for use by the UE 400, any of a variety of various operating systems or combinations of operating systems.

The memory 410 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card'. The memory 410 may allow the UE 400 to access instructions, application programs and the like, stored on transitory or non-transitory memory media, to off-load data, or to upload data. An article of manufacture, such as one utilizing a communication system may be tangibly embodied as or in the memory 410, which may be or comprise a device-readable storage medium.

The processing circuitry 402 may be configured to communicate with an access network or other network using the communication interface 412. The communication interface 412 may comprise one or more communication subsystems and may include or be communicatively coupled to an antenna 422. The communication interface 412 may include one or more transceivers used to communicate, such as by communicating with one or more remote transceivers of another device capable of wireless communication (e.g., another UE or a network node/base station in an access network). Each transceiver may include a transmitter 418 and/or a receiver 420 appropriate to provide network communications (e.g., optical, electrical, frequency allocations, and so forth). Moreover, the transmitter 418 and receiver 420 may be coupled to one or more antennas (e.g., antenna 422) and may share circuit components, software or firmware, or alternatively be implemented separately.

In some embodiments, communication functions of the communication interface 412 may include cellular communication, Wi-Fi communication, LPWAN communication, data communication, voice multimedia communication, communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 412, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device, in addition to other components as described in relation to the UE 400 shown in FIG. 4.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 5:
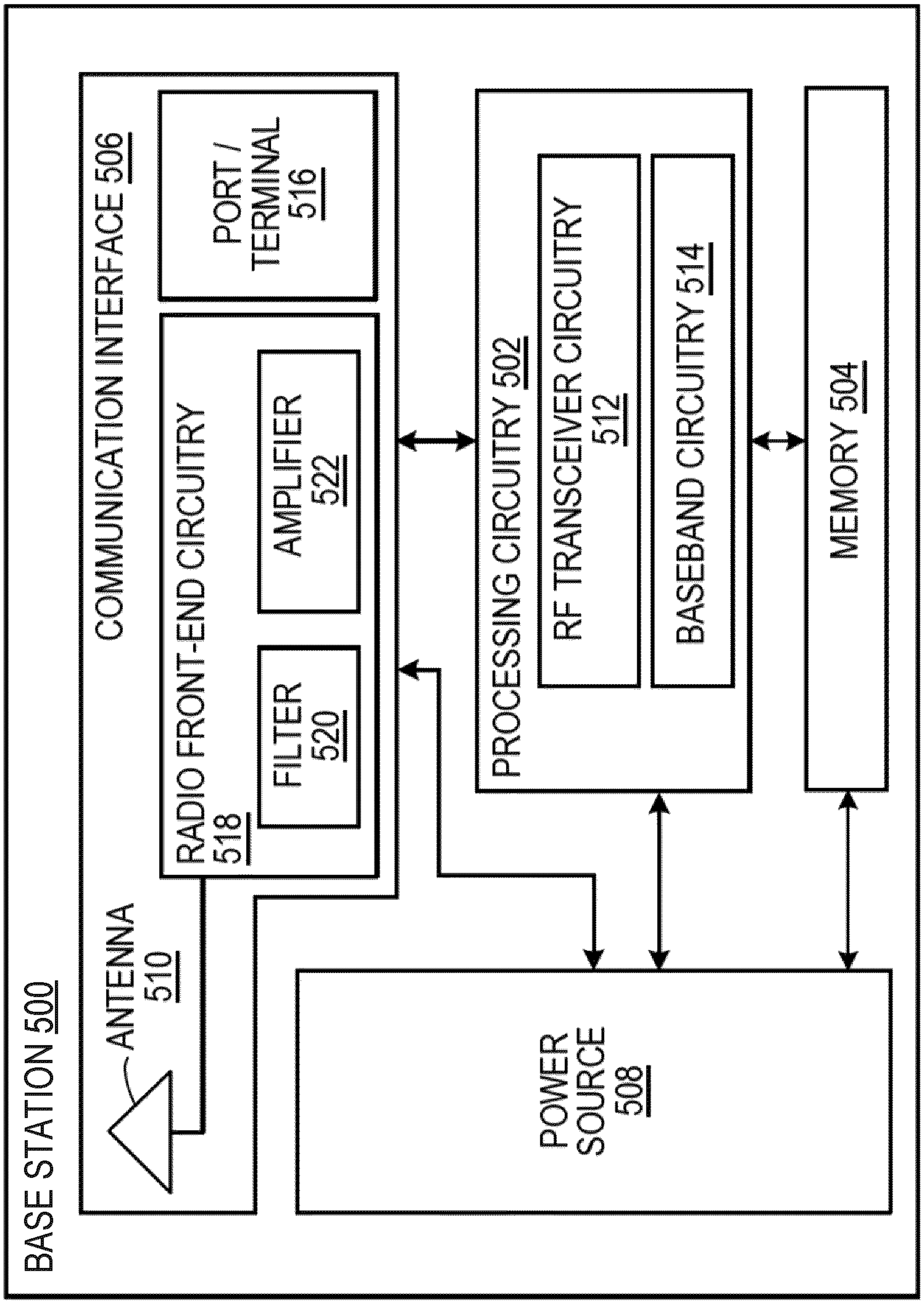
FIG. 5 shows a base station in accordance with some embodiments.

FIG. 5 shows a base station 500 in accordance with some embodiments. As noted above, the term network node is used interchangeably with base station herein. The term "base station" or "network node" refers to equipment capable, configured, arranged and/or operable to communicate directly or indirectly with a UE and/or with other network nodes or equipment, in a telecommunication network. Examples of base stations include, but are not limited to, access points (APs) (e.g., radio access points), radio base stations, Node Bs, evolved Node Bs (eNBs) and NR NodeBs (gNBs).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A base station may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The base station 500 includes processing circuitry 502, a memory 504, a communication interface 506, and a power source 508, and/or any other component, or any combination thereof. The base station 500 may be composed of multiple physically separate components (e.g., a NodeB component and a RNC component, or a BTS component and a BSC component, etc.), which may each have their own respective components. In certain scenarios in which the base station 500 comprises multiple separate components (e.g., BTS and BSC components), one or more of the separate components may be shared among several base stations. For example, a single RNC may control multiple NodeBs. In such a scenario, each unique NodeB and RNC pair, may in some instances be considered a single separate network node. In some embodiments, the base station 500 may be configured to support multiple radio access technologies (RATs). In such embodiments, some components may be duplicated (e.g., separate memory 504 for different RATs) and some components may be reused (e.g., a same antenna 510 may be shared by different RATs). The network node 500 may also include multiple sets of the various illustrated components for different wireless technologies integrated into network node 500, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within base station 500.

The processing circuitry 502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other base station 500 components, such as the memory 504, to provide base station 500 functionality. For example, the processing circuitry 502 may be configured to cause the base station to perform any of the methods described herein, and for example to perform the methods described below with reference to FIGS. 9, 10 and/or 13.

In some embodiments, the processing circuitry 502 includes a system on a chip (SOC). In some embodiments, the processing circuitry 502 includes one or more of radio frequency (RF) transceiver circuitry 512 and baseband processing circuitry 514. In some embodiments, the radio frequency (RF) transceiver circuitry 512 and the baseband processing circuitry 514 may be on separate chips (or sets of chips), boards, or units, such as radio units and digital units. In alternative embodiments, part or all of RF transceiver circuitry 512 and baseband processing circuitry 514 may be on the same chip or set of chips, boards, or units.

The memory 504 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 502. The memory 504 may store any suitable instructions, data, or information, including a computer program, software, an application including one or more of logic, rules, code, tables, and/or other instructions capable of being executed by the processing circuitry 502 and utilized by the base station 500. The memory 504 may be used to store any calculations made by the processing circuitry 502 and/or any data received via the communication interface 506. In some embodiments, the processing circuitry 502 and memory 504 is integrated.

The communication interface 506 is used in wired or wireless communication of signalling and/or data between a base station, access network, and/or UE. As illustrated, the communication interface 506 comprises port(s)/terminal(s) 516 to send and receive data, for example to and from a network over a wired connection. The communication interface 506 also includes radio front-end circuitry 518 that may be coupled to, or in certain embodiments a part of, the antenna 510. Radio front-end circuitry 518 comprises filters 520 and amplifiers 522. The radio front-end circuitry 518 may be connected to an antenna 510 and processing circuitry 502. The radio front-end circuitry may be configured to condition signals communicated between antenna 510 and processing circuitry 502. The radio front-end circuitry 518 may receive digital data that is to be sent out to other network nodes or UEs via a wireless connection. The radio front-end circuitry 518 may convert the digital data into a radio signal having the appropriate channel and bandwidth parameters using a combination of filters 520 and/or amplifiers 522. The radio signal may then be transmitted via the antenna 510. Similarly, when receiving data, the antenna 510 may collect radio signals which are then converted into digital data by the radio front-end circuitry 518. The digital data may be passed to the processing circuitry 502. In other embodiments, the communication interface may comprise different components and/or different combinations of components.

In certain alternative embodiments, the base station 500 does not include separate radio front-end circuitry 518, instead, the processing circuitry 502 includes radio front-end circuitry and is connected to the antenna 510. Similarly, in some embodiments, all or some of the RF transceiver circuitry 512 is part of the communication interface 506. In still other embodiments, the communication interface 506 includes one or more ports or terminals 516, the radio front-end circuitry 518, and the RF transceiver circuitry 512, as part of a radio unit (not shown), and the communication interface 506 communicates with the baseband processing circuitry 514, which is part of a digital unit (not shown).

The antenna 510 may include one or more antennas, or antenna arrays, configured to send and/or receive wireless signals. The antenna 510 may be coupled to the radio front-end circuitry 518 and may be any type of antenna capable of transmitting and receiving data and/or signals wirelessly. In certain embodiments, the antenna 510 is separate from the network node 500 and connectable to the network node 500 through an interface or port.

The antenna 510, communication interface 506, and/or the processing circuitry 502 may be configured to perform any receiving operations and/or certain obtaining operations described herein as being performed by the network node. Any information, data and/or signals may be received from a UE, another network node and/or any other network equipment. Similarly, the antenna 510, the communication interface 506, and/or the processing circuitry 502 may be configured to perform any transmitting operations described herein as being performed by the network node. Any information, data and/or signals may be transmitted to a UE, another network node and/or any other network equipment.

The power source 508 provides power to the various components of base station 500 in a form suitable for the respective components (e.g., at a voltage and current level needed for each respective component). The power source 508 may further comprise, or be coupled to, power management circuitry to supply the components of the base station 500 with power for performing the functionality described herein. For example, the base station 500 may be connectable to an external power source (e.g., the power grid, an electricity outlet) via an input circuitry or interface such as an electrical cable, whereby the external power source supplies power to power circuitry of the power source 508. As a further example, the power source 508 may comprise a source of power in the form of a battery or battery pack which is connected to, or integrated in, power circuitry. The battery may provide backup power should the external power source fail.

Embodiments of the base station 500 may include additional components beyond those shown in FIG. 5 for providing certain aspects of the base station's functionality, including any of the functionality described herein and/or any functionality necessary to support the subject matter described herein. For example, the base station 500 may include user interface equipment to allow input of information into the base station 500 and to allow output of information from the base station 500. This may allow a user to perform diagnostic, maintenance, repair, and other administrative functions for the base station 500.

Figure 6:
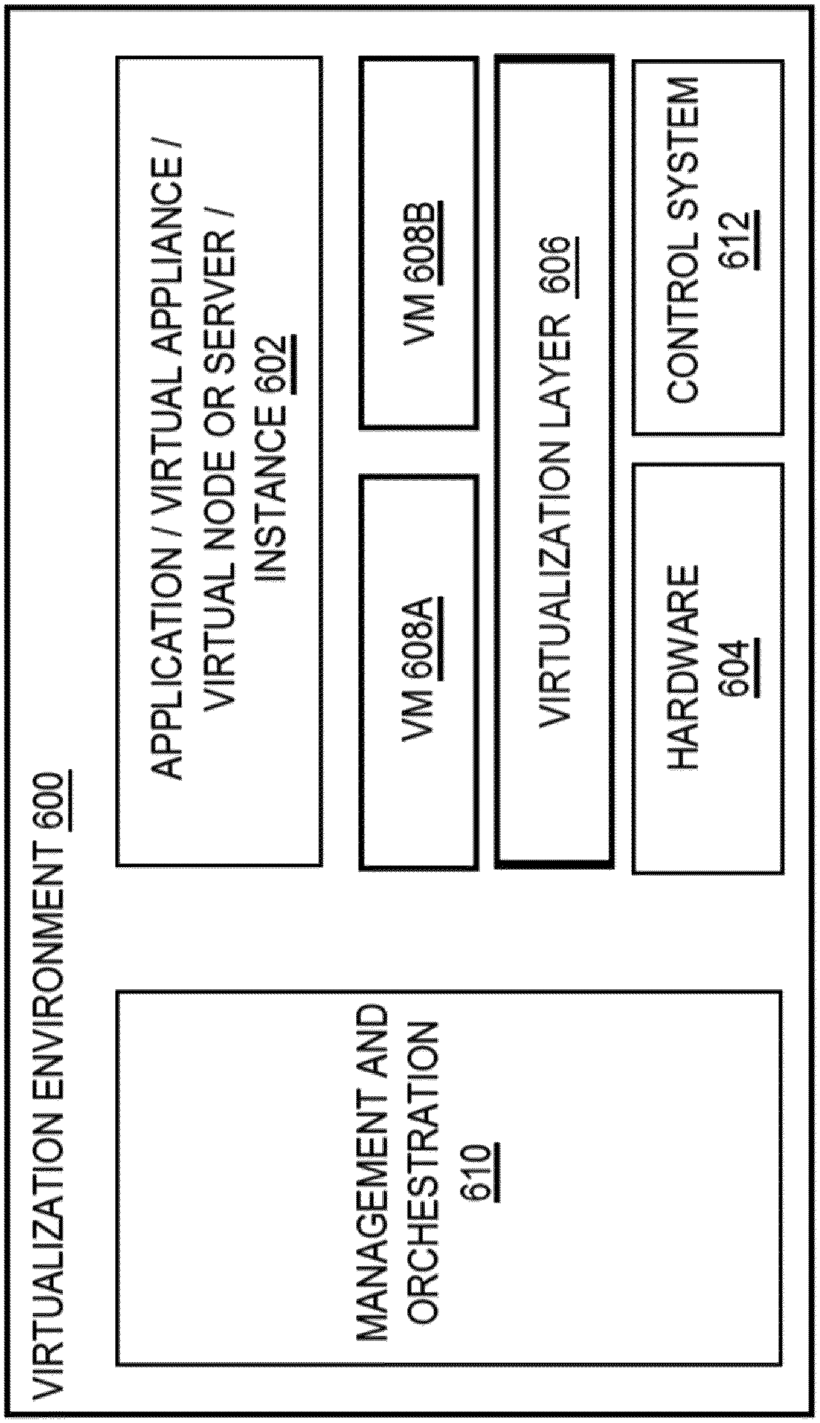
FIG. 6 is a block diagram illustrating a virtualization environment in which functions implemented by some embodiments may be virtualized.

FIG. 6 is a block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 600 hosted by one or more of hardware nodes, such as a hardware computing device that operates as a network node or base station, a wireless device/UE, or a core network node. Further, in embodiments in which the virtual node does not require radio connectivity (e.g., a core network node), then the node may be entirely virtualized.

Applications 602 (which may alternatively be called software instances, virtual appliances, network functions, virtual nodes, virtual network functions, etc.) are run in the virtualization environment 600 to implement some of the features, functions, and/or benefits of some of the embodiments disclosed herein.

Hardware 604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 606 (also referred to as hypervisors or virtual machine monitors (VMMs)), provide VMs 608*a* and 608*b* (one or more of which may be generally referred to as VMs 608), and/or perform any of the functions, features and/or benefits described in relation with some embodiments described herein. The virtualization layer 606 may present a virtual operating platform that appears like networking hardware to the VMs 608.

The VMs 608 comprise virtual processing, virtual memory, virtual networking or interface and virtual storage, and may be run by a corresponding virtualization layer 606. Different embodiments of the instance of a virtual appliance 602 may be implemented on one or more of VMs 608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 608 may be a software implementation of a physical machine that runs programs as if they were executing on a physical, non-virtualized machine. Each of the VMs 608, and that part of hardware 604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 608 on top of the hardware 604 and corresponds to the application 602.

Hardware 604 may be implemented in a standalone network node with generic or specific components. Hardware 604 may implement some functions via virtualization. Alternatively, hardware 604 may be part of a larger cluster of hardware (e.g. such as in a data center or CPE) where many hardware nodes work together and are managed via management and orchestration 610, which, among others, oversees lifecycle management of applications 602. In some embodiments, hardware 604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signalling can be provided with the use of a control system 612 which may alternatively be used for communication between hardware nodes and radio units.

Although the computing devices described herein (e.g., wireless devices/UEs, base stations/network nodes) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the base station, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

As noted above, in the techniques described herein a base station selects UL and DL UEs for full duplex (FD) transmissions with low interference based on the announcement on a D2D connection (e.g. a sidelink connection) by a reduced set of UEs (e.g., only UEs with data to transmit to the base station) and on the monitoring of the announcement message by a reduced set of UEs (e.g., only UEs with data to receive from the base station).

Figure 7:
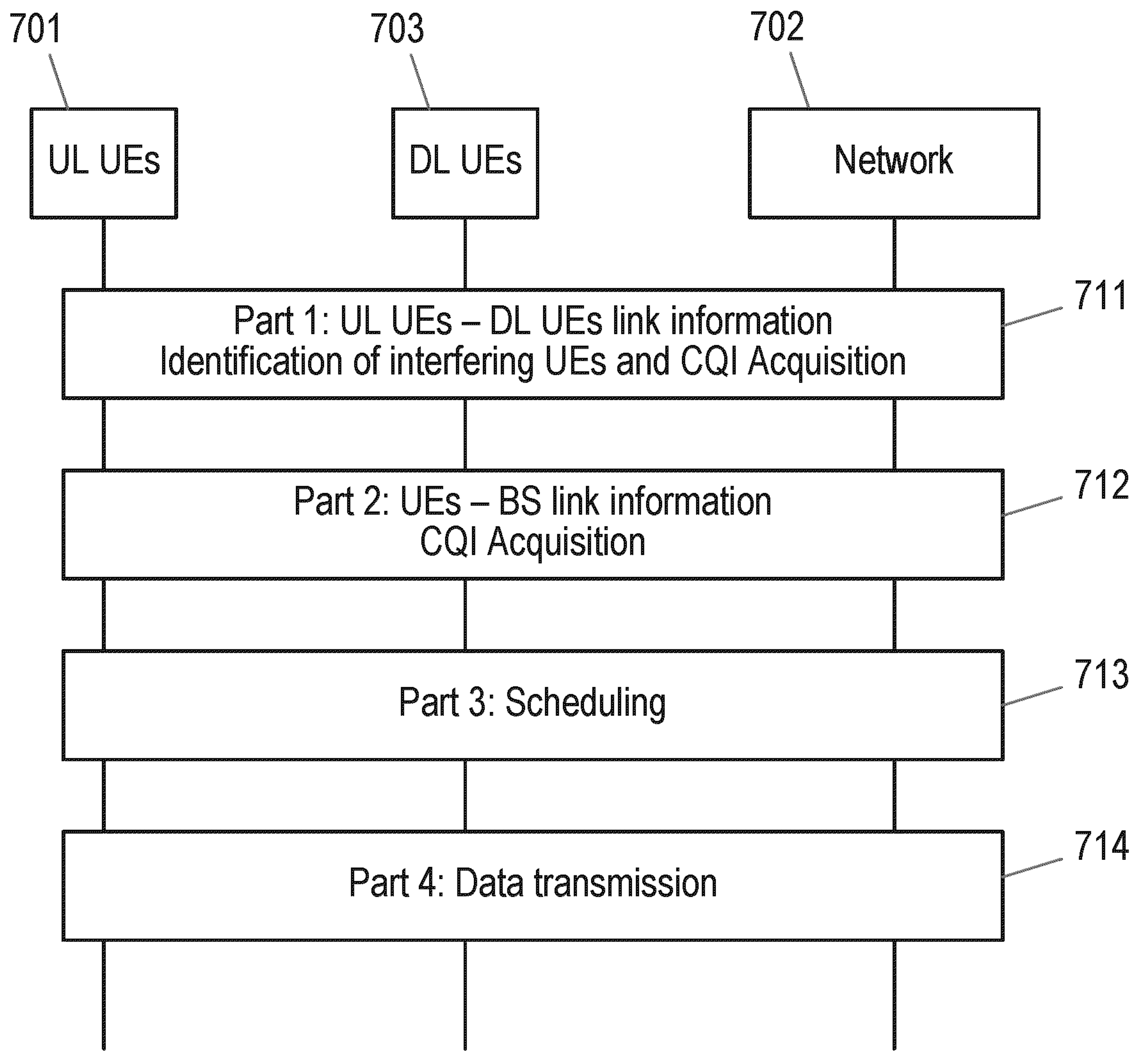
FIG. 7 is a flow chart illustrating a method of performing full duplex communications in a telecommunication network that makes use of the techniques described herein.

The flow chart in FIG. 7 outlines a method of performing full duplex communications in a telecommunication network that makes use of the techniques described herein. The method includes operations by wireless devices 701 that have data to transmit to the base station 702, one or more of which will be selected as an UL UE 701 for the FD communication, operations by wireless devices 703 that the base station 702 has data to transmit to, one or more of which will be selected as a DL UE 703 for the FD communication, and operations by the base station 702.

In the first part/step 711, identification of interfering UEs is performed and Channel Quality Indicator (CQI) is acquired regarding the links between the UL UEs 701 and the DL UEs 703. Step 711 is discussed further below with reference to the signalling diagram in FIG. 8(*a*).

In the second part/step 712, CQI is acquired for the links between the UEs 701, 703 and the base station 702. Step 712 is discussed further below with reference to the signalling diagram in FIG. 8(*b*).

In the third part/step 713, resources are scheduled for the full duplex communication. Step 713 is discussed further below with reference to the flow chart in FIGS. 9(*a*), 9(*b*) and 9(*c*). Although FIG. 9 illustrates a particular scheduling method for pairing wireless devices for full duplex communications, it will be appreciated that other scheduling methods and techniques can be used with the wireless device pairing technique shown in the first part 711 and the second part 712. In a similar way, the scheduling method shown in FIG. 9, or aspects of the scheduling method shown in FIG. 9, can be used where the wireless devices are paired using techniques other than those described below with reference to FIG. 8. For example, the scheduling method shown in FIG. 9, or aspects of the scheduling method shown in FIG. 9, can be used with other peer discovery techniques, provided the other techniques are able to identify (D2D/sidelink) interference and/or acquire (D2D/sidelink) CQI in the same frequency spectrum used for data communications between UEs and base stations.

In step 713 the base station can inform the relevant UL UEs and DL UEs of the particular resources scheduled for the full duplex communications.

Finally, in the fourth part/step 714, the full duplex communication is performed using the scheduled resources and the base station 702 receives data from the one or more UL UEs 701 on one or more frequencies while transmitting data to the one or more DL UEs 703 on the same frequencies.

Figure 8A:
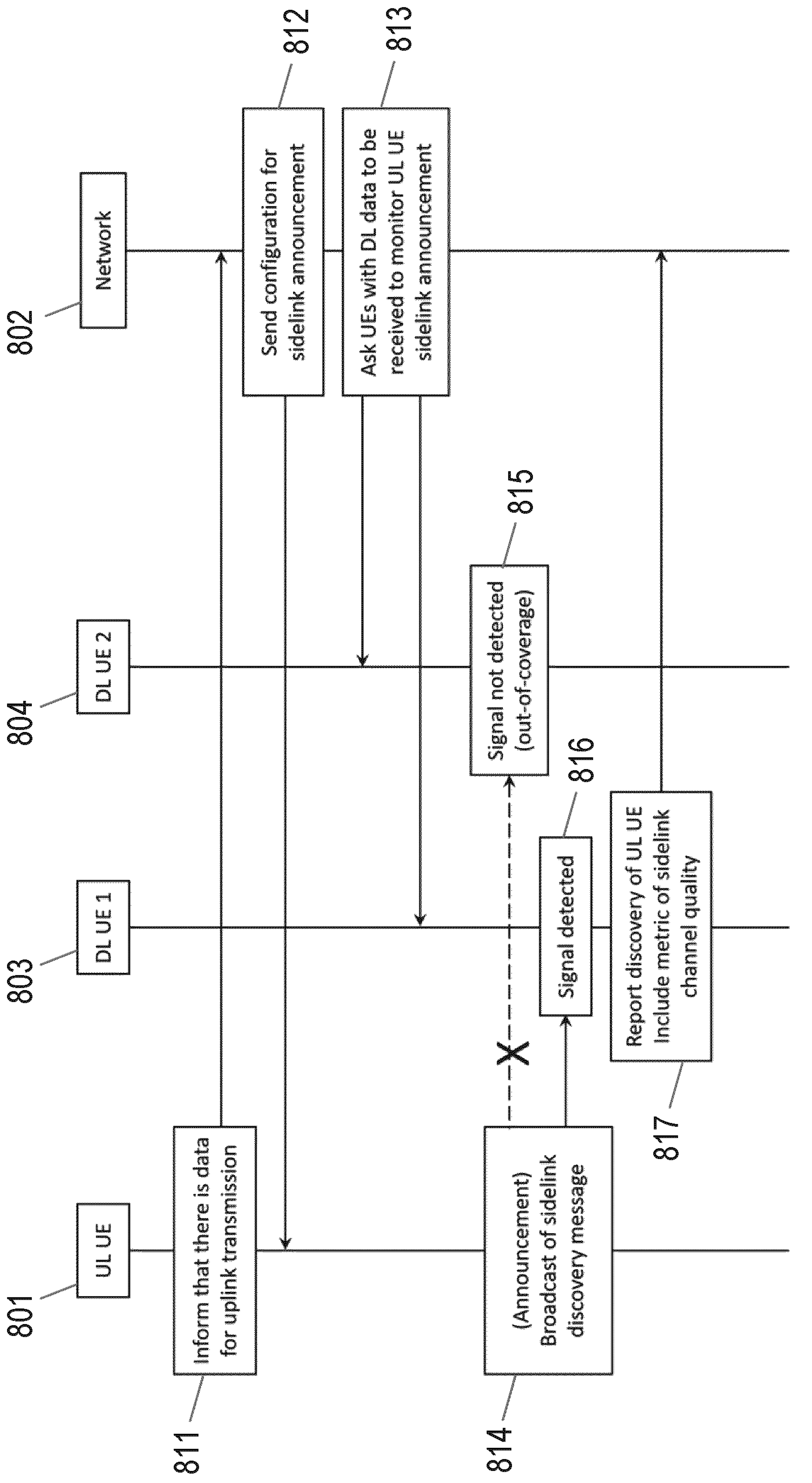
FIG. 8(*a*) is a signalling diagram illustrating the identification of interfering UEs and acquisition of CQI between UL UEs and DL UEs, and FIG. 8(*b*) is a signalling diagram illustrates the acquisition of CQI for the links between the base station and the UL UE and between the base station and the DL UEs.
Figure 8B:
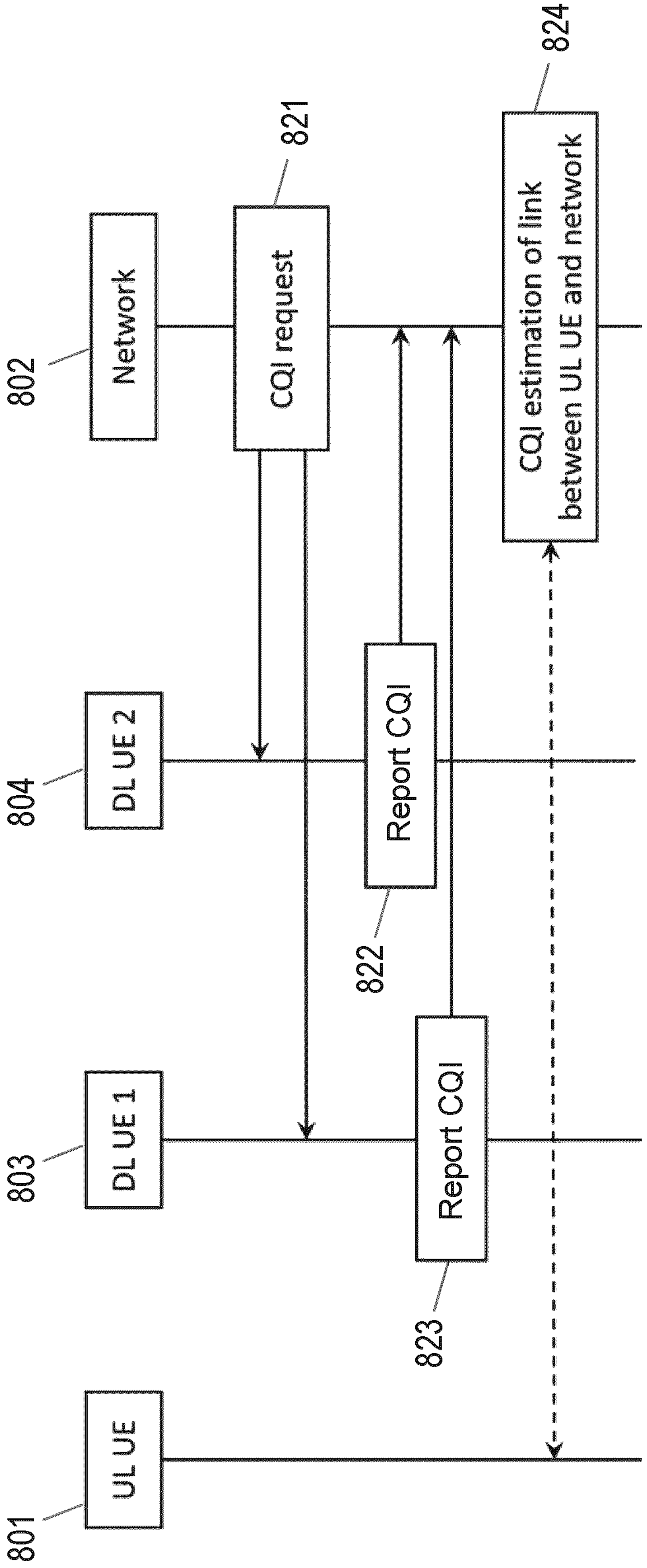
Figure 9A:
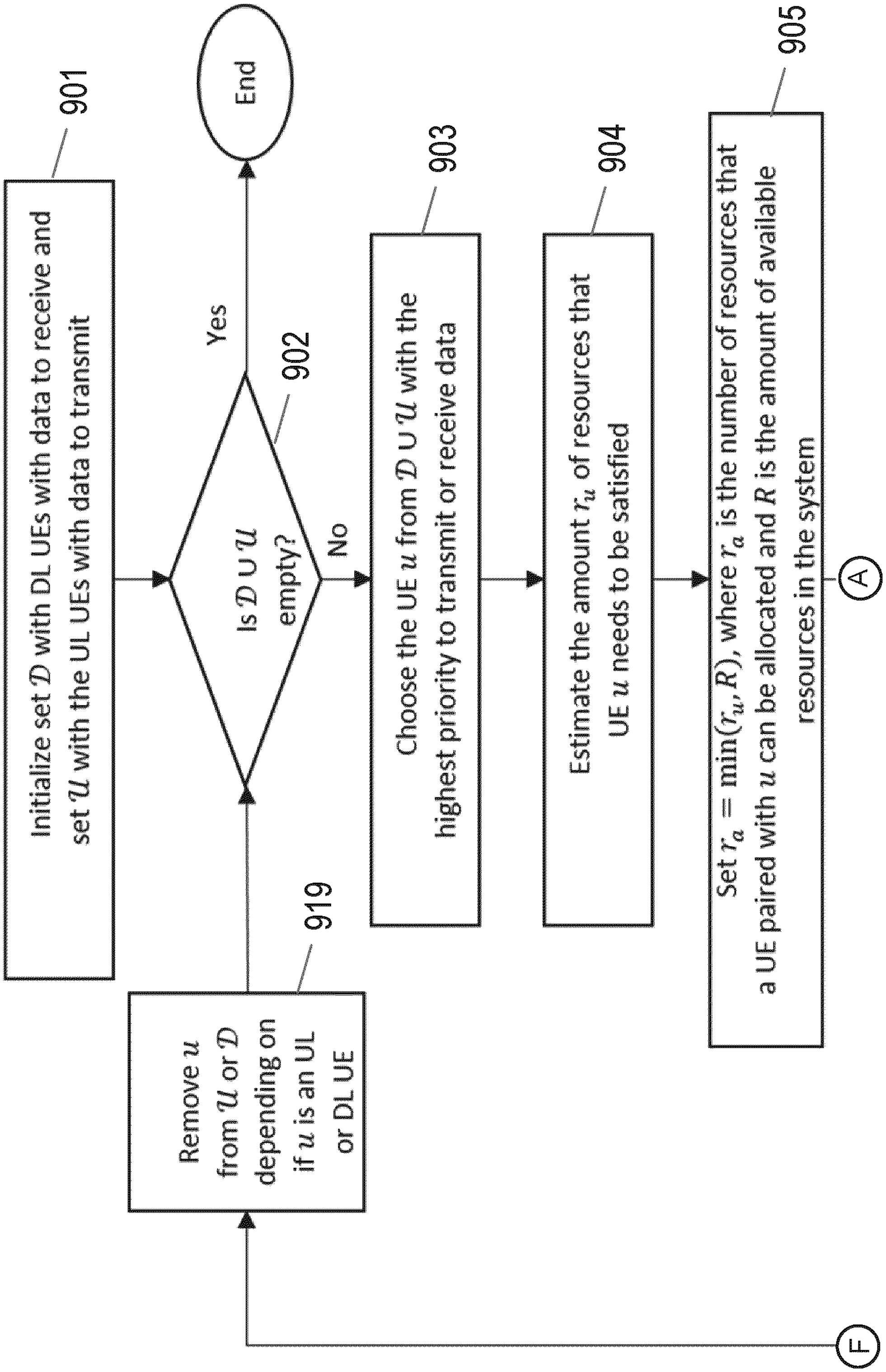
FIGS. 9(*a*), (*b*) and (*c*) illustrate an exemplary method for resource scheduling according to the techniques described herein.
Figure 9B:
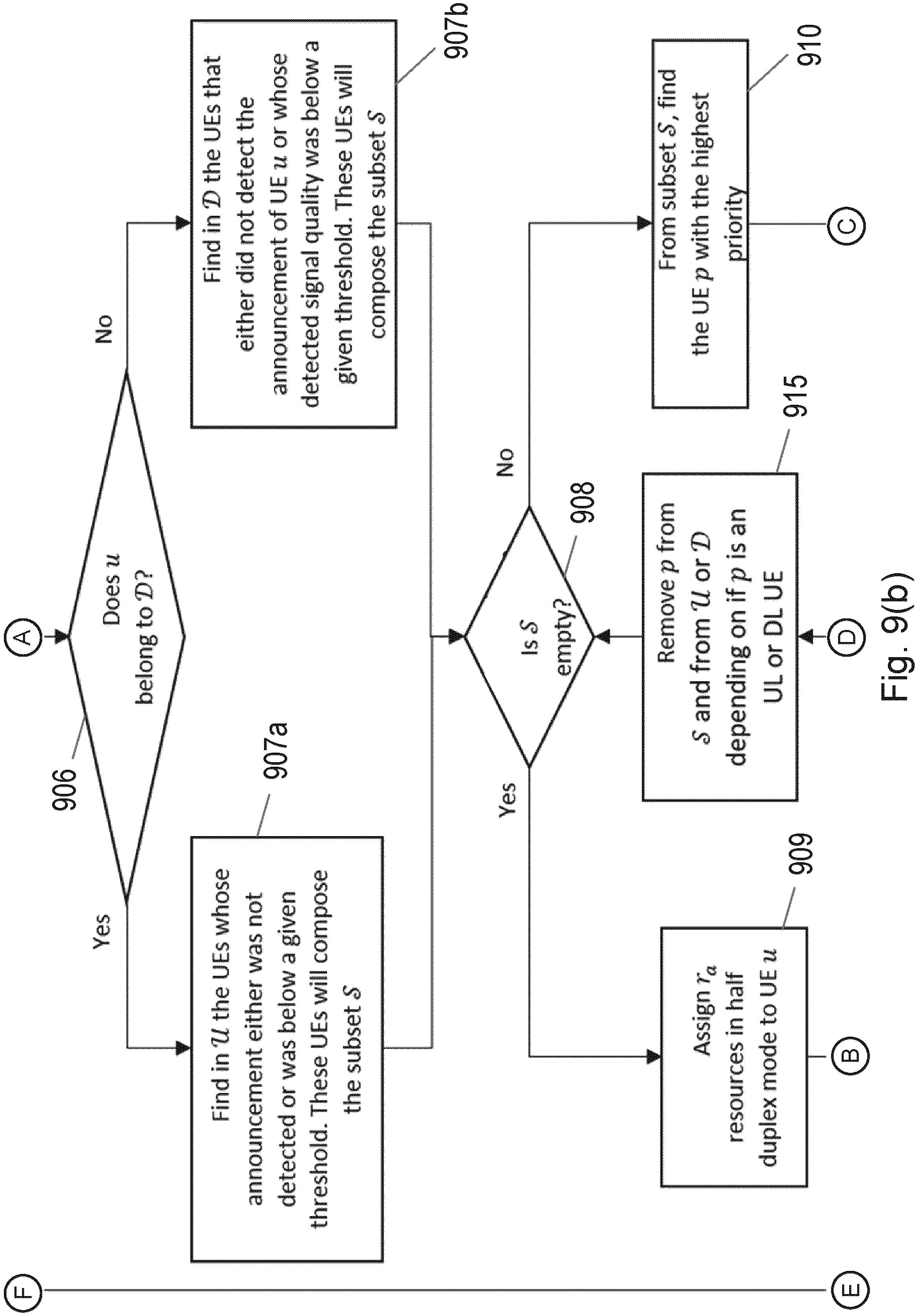
Figure 9C:
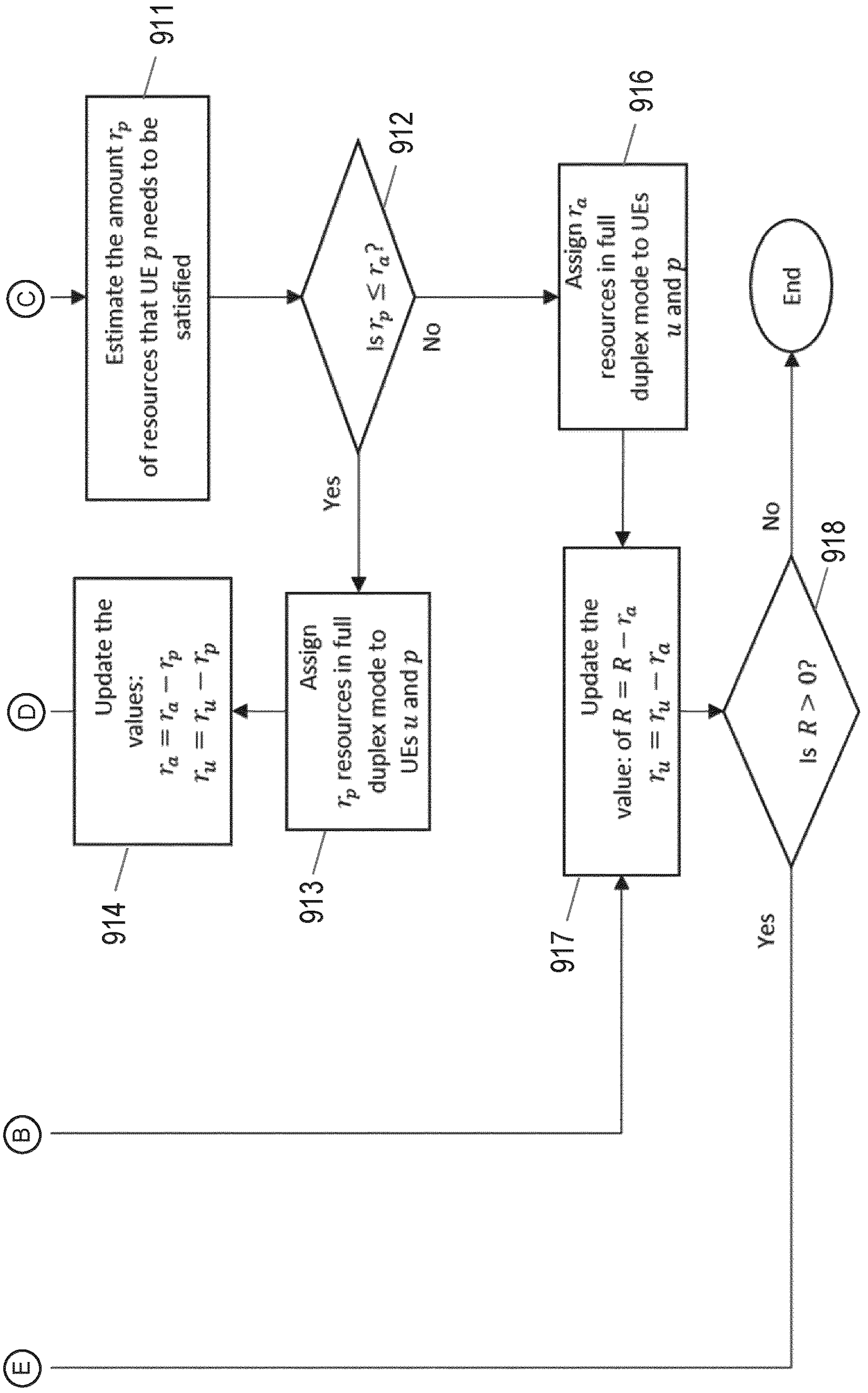

FIG. 8(*a*) is a signalling diagram illustrating the identification of interfering UEs and acquisition of CQI between the UL UEs and the DL UEs. This corresponds to step 711 in FIG. 7. FIG. 8(*a*) is discussed with reference to the D2D communication being sidelink communications, but it will be appreciated that the signalling in FIG. 8(*a*) can be used for other types of D2D communications.

FIG. 8(*a*), shows the signalling between wireless device 801, a base station 802, and two other wireless devices 803, 804. Wireless device 801 has data to transmit to the base station 802, and wireless device 801 can be selected as an UL UE for the FD communication. For simplicity, wireless device 801 is simply referred to as UL UE 801 in the following discussion. The base station 802 has data to transmit to the wireless device 803 (referred to as the "first DL UE" 803) and the wireless device 804 (referred to as the "second DL UE" 804). One or more of wireless devices 803, 804 may be selected as a DL UE for the FD communication.

The process starts with the UL UE 801 sending an indication (e.g. a transmission request) 811 to the base station 802 to inform the base station 802 that the UL UE 801 has data for uplink transmission.

If the base station 802 is to operate in a full duplex mode (and the base station 802 does not already have information, or up-to-date information, on which UEs may interfere with each other), the base station 802 sends a sidelink announcement configuration 812 to the UL UE 801. The sidelink announcement configuration configures the UL UE 801 to perform a sidelink announcement. As noted above, a sidelink announcement is used by a first UE to announce to other nearby UEs that the first UE is available for sidelink communications. For example, the sidelink announcement can be as described in section 5.3.1.2 of 3GPP TS 23.303 v15.1.0 or v16.0.0.

The sidelink announcement configuration can include one or more types of the following information:

- a "flag" that when set to "TRUE" indicates that the UL UE 801 should perform a sidelink announcement (i.e. should transmit a sidelink announcement);
- an identifier for the UL UE 801 (e.g. a unique code) to be included in the announcement in order to allow monitoring UEs to identify which UE is performing the announcement;
- an indication of time instant to start performing the sidelink announcement;
- the periodicity of the transmission of the sidelink announcement and for how long or how many times it should be repeated;
- the frequency resources (e.g. one or more frequencies or frequency channels) to use for transmitting the sidelink announcement;
- the transmission power level to be used for the sidelink announcement.

Regarding the transmission power level to be used for the sidelink announcement, one possibility is for the base station 802 to set the transmission power level equal to the transmission power to be used for UL data transmission to the base station 802. This means that the interference levels caused by the sidelink announcement(s) will be similar to the interference caused by UL data transmissions. Another possibility is for the base station 802 to set the transmission power used for the sidelink announcement equal to the maximum transmission power that can be used for UL data transmission. This will allow the base station/network to estimate the maximum interference level caused during UL data transmission based on the signal quality measurement reported by DL UEs 803, 804 during the subsequent sidelink announcements.

Regarding the frequency resources to use for the sidelink announcement, one possibility is for the base station 802 to set the frequency/frequency channel(s) to one or more of the frequency/frequency channel(s) available for UL data transmission. This can help to provide a better estimate of any interference that may be caused by the UL UE 801 to the DL UE 803, 804 in a full duplex communication with the base station 802.

The base station 802 also sends a sidelink announcement monitoring configuration 813 to any UEs that the base station 802 has data to transmit to. Thus, the base station 802 sends the sidelink announcement monitoring configuration to the first DL UE 803 and the second DL UE 804. The sidelink announcement monitoring configuration configures the DL UEs 803, 804 to monitor for sidelink announcements. The same sidelink announcement monitoring configuration 813 can be sent the first DL UE 803 and the second DL UE 804, or respective sidelink announcement monitoring configurations to the first DL UE 803 and the second DL UE 804.

The sidelink announcement monitoring configuration can include one or more types of the following information:

- a "flag" that when set to "TRUE" indicates that the respective DL UE 803, 804 must monitor (e.g. 'listen for') a sidelink announcement;
- an identifier (e.g. a unique code) for the UL UE(s) 801 whose sidelink announcements are to be monitored;
- an indication of a time instant to start performing the monitoring;
- an indication of a period of time in which to perform the monitoring;
- the frequency resources (e.g. one or more frequencies or frequency channels) to monitor for sidelink announcements;
- a configuration indicating whether the DL UE 803, 804 should report any one or more of: CQI, a Rank Indication (RI), a (quantized) complex channel coefficient, a Precoding Matrix Indication (PMI), or a subset thereof for a set of sub-bands and/or wideband for the link between the DL UE 803, 804 and a subset of the possible UL UEs 801;
- a value of a timer, which, after expiry, triggers the DL UE to send a report including information on the detected sidelink announcements to the base station 802.

Next, the UL UE 801 broadcasts or transmits the sidelink announcement (e.g. sidelink discovery message) 814 according to the sidelink announcement configuration received in step 812. Thus, the sidelink announcement can be transmitted in the time interval and/or with the assigned frequency resources.

Following receipt of the sidelink announcement monitoring configuration 813, the DL UEs 803, 804 monitor for sidelink announcements according to the received configuration 813. That is, the DL UEs 803, 804 monitor for sidelink announcements from the indicated UL UEs 801, at the indicated time(s) and on the indication frequency(ies). For any sidelink announcements received or detected by the DL UEs 803, 804, the DL UEs 803, 804 may make signal quality measurements of the received sidelink announcements.

At step 815 the second DL UE 804 does not detect the sidelink announcement(s) from the UL UE 801. This may be because the second DL UE 804 is out of coverage of the UL UE 801.

At step 816 the first DL UE 803 detects the sidelink announcement(s) from the UL UE 801.

The first DL UE 803 then reports to the base station 802 which sidelink announcements were detected (step 817). The sending of the report may be triggered at the expiry of a timer configured by the base station 802 or network. In some embodiments, this timer could be set to be equal to the sidelink announcement period (i.e. the duration with which the sidelink announcements are transmitted). Alternatively, the sending of the report may be triggered as soon as a preconfigured number of UL UE sidelink announcement(s) are detected.

The report 817 may include one or more signal quality measurements of the link between the DL UE 803 and the UL UE 801 that transmitted the sidelink announcement. The signal quality measurements may be any of reference signal received power (RSRP), reference signal received quality (RSRQ), etc. The base station 802 may use these measurements in estimating the interference from an UL UE 801 to the DL UE 803. For example, if UL data transmission is to use a power level different from the one used for transmitting the sidelink announcement, the base station 801 may estimate the interference that will be caused during UL data transmission, and it may be able to verify if a UL UE detected as interfering during a sidelink announcement is still an interferer during UL data transmission.

The report 817 may include any one or more of a CQI, a RI and a PMI, or a subset thereof for a set of sub-bands and/or wideband for the link between the DL UE 803 and a subset of detected UL UEs 801.

The report 817 may be restricted to a subset of UL UEs 801 whose sidelink announcements are received with a signal quality higher than a predefined threshold.

The report 817 may be restricted to a predefined maximum number of UL UEs 801.

In some embodiments, a DL UE that does not detect a sidelink announcement or any sidelink announcement (e.g. the second DL UE 804) may send a report to the base station 802 indicating that the sidelink announcement(s) were not received. This is not shown in FIG. 8(*a*). Alternatively if a DL UE does not detect a or any sidelink announcement (e.g. the second DL UE 804), the DL UE 804 may refrain from sending a report to the base station 802. In these embodiments, the base station 802 can infer from the lack of a report from the second DL UE 804 that the second DL UE 804 did not receive or detect any sidelink announcements.

The base station 802 receives the report(s) 817 from the UEs 803, 804 that were configured to monitor for sidelink announcements. The information contained in or derived from the reports is used to identify UEs to pair up for the full duplex communication, and to schedule particular resources to the full duplex communication.

As noted above, the base station 802 can send a sidelink announcement configuration 812 to the UL UE 801 following receipt of an indication from the UL UE 801 that it has data to transmit, and the base station 802 is to operate in a full duplex mode. However, it may be the case that the base station 802 already has information available on which DL UEs 803, 804 might be adversely affected by transmissions from UL UEs 801, and so further sidelink announcements may not be required. The base station 802 may consider previously-obtained knowledge relating to UL/DL UEs sidelink announcements still valid if the previous sidelink announcements occurred less than a threshold amount of time ago, and if the same UL UEs still have data to transmit and the same DL UEs have data to receive in the next transmission time intervals (TTIs). Previously-obtained knowledge may also be considered to still be valid if the UL UEs and DL UEs exchange roles (i.e. the UL UE 801 will now be a DL UE, and DL UE 803 will now be an UL UE).

If the base station 802 receives a number of transmission requests 811 from different UL UEs 801, the base station 802 may determine whether the sidelink announcements by these UL UEs 801 will be synchronous (i.e. transmitted at the same time) or not.

FIG. 8(*b*) continues the signalling diagram from FIG. 8(*a*) and illustrates the acquisition of CQI for the links between the base station 802 and the UL UE 801 and between the base station 802 and the DL UEs 803, 804. This corresponds to step 712 in FIG. 7.

In step 821, the base station 802 sends a CQI request 821 to each of the DL UEs 803, 804. The CQI request 821 asks the DL UE 803, 804 to report on the CQI for the DL link from the base station 802 to the DL UE 803, 804.

The DL UEs 803, 804 measure the CQI, for example by measuring the received power of a reference signal transmitted by the base station 802. This measurement is known to the skilled in the art as reference signal received power (RSRP) measurement. The CQI can also or alternatively be measured by measuring the bit error rate (BER) of the received reference signal. In another example, the DL UEs 803, 804 can measure the CQI by first estimating the link's signal-to-noise ratio (SNR), after identifying the most suitable modulation and coding scheme (MCS) (for example using a pre-configured model that maps SNR values into the maximum MCS that can be used for transmission with a maximum transmission error probability lower than a predefined threshold), and identifying on a standardised table mapping MCS into a CQI index (e.g. the ones defined at 3GPP TS 38.214 v. 16.1.0 for NR) the CQI index related to the MCS selected on the second step.

The second DL UE 804 reports the CQI 822 to the base station 802, and the first DL UE 803 reports the CQI 823 to the base station 802. CQI can be sent to a base station 802 in a Channel State Information (CSI) report.

Following receipt of the reported CQIs from the DL UEs 803, 804, in step 824 the base station 802 estimates the CQI of the UL link from the UL UE 801 to the base station 802. The base station 802 can estimate the CQI of the UL in a similar way to how a DL UE 803, 804 estimates the CQI of the link between the base station 802 and the DL UE 803, 804, as described above. Alternatively, the CQI of the UL can be estimated by the base station 802 measuring the received power of reference signals transmitted by the UL UE 801. Alternatively, the CQI of the UL can be estimated by the base station 802 using measurement reports sent by the UL UE 801 to the base station 802. These measurement reports contain the CQI estimate by the UL UE 801, where the CQI estimate by the UL UE 801 is based on similar measurements as are used for CQI estimation by the DL UEs 803, 804.

The flow chart shown in FIG. 9 (split across FIGS. 9(*a*), 9(*b*) and 9(*c*)) illustrates an exemplary implementation of the resource scheduling in step 713 of FIG. 7. As noted above, alternative methods of resource scheduling, including existing resource scheduling methods, can be used in step 713. The method in FIG. 9 is described below as being performed by the base station, but it will be appreciated that the resource scheduling could be performed by a different network node in the radio access network, e.g. a resource scheduling node, or by a node in the core network.

In the first part of the scheduling method in FIG. 9, primarily the steps shown in FIG. 9(*a*) and the first half of FIG. 9(*b*), pairs of UEs (i.e. an UL UE and a DL UE) are identified for the full duplex communication. In the second part of the method in FIG. 9, primarily the steps shown in the second half of FIG. 9(*b*) and FIG. 9(*c*), specific resources (i.e. resource blocks, time slots and frequency/ies) are scheduled or allocated to the full duplex communications involving that pair of UEs.

At the start of the scheduling method in FIG. 9, the base station (or other node) has CQI information available relating to one or more of: the links between the UL UE and DL UEs, the links from the UL UEs to the base station, and the links from the base station to the DL UEs.

In the first step, step 901, the sets $\mathcal{D}$ and $\mathcal{U}$ are initialized. Set $\mathcal{D}$ includes all UEs with data to receive from the base station (i.e. the DL UEs), and set $\mathcal{U}$ includes all UEs with data to transmit (i.e. the UL UEs).

In step 902 it is checked whether the union of sets $\mathcal{U}$ and $\mathcal{D}$ is empty. The union of the sets will be empty if sets $\mathcal{U}$ and $\mathcal{D}$ are individually empty. If the union of the sets is empty, the method ends. The union of the sets will be empty when all UEs with data to transmit or receive have been scheduled. Otherwise, in step 903 a UE u is identified from the union of sets $\mathcal{D}$ and $\mathcal{U}$. The UE u is identified as the UE in the union of the sets with the highest priority to transmit or receive data.

Step 903 can comprise determining the priority of the UEs in the union of the sets. In some embodiments, the priority of a UE can be estimated at the base station by a function $P_u(\cdot)$, which can take as input different metrics, e.g., any of head-of-line packet delay (i.e. the current delay of the oldest data packet in a transmit buffer of the UE or base station), UE throughput, UE QoS, the number of neighbour UEs (where a neighbour UE is a UE that is in the proximity of the relevant UE in terms of path loss, geometric distance or received signal strength), etc.

One example of the function can be $$P_u(t_u, T_u) = \max\left(0, \frac{(T_u - t_u)}{T_u}\right),$$

where $t_u$ is the throughput of UE u and $T_u$ is the target throughput of UE u.

Another approach is to consider the UE priority to be equal to the number of neighbours it has. The reasoning behind this definition is to start the UE pairing with the UE that has the fewest degrees of freedom on the choice of UEs to be paired with.

Another possibility is to consider the priority of a UE equal to the inverse of its throughout, e.g., $$P_u(t_u) = \frac{1}{t_u},$$

in order to achieve max-min fairness among UEs. Thus, according to the max-min fairness principle, the throughput of the UE with the lowest throughput is maximised. That is, in a max-min fair system, the throughput of the "poorest" UE is maximised over all possible resource or power allocation strategies. More generally, with the priority of the UE being equal to the inverse of its throughput, the UE with lowest throughput will have the higher priority to be scheduled, in order to increase its throughput. As a consequence, the system will tend to keep fairness between the UEs, since it will always try to maximise the throughput of the UE with the lowest throughput. In a stationary state, the UEs will all have a similar throughput, since when one of them increases its throughput it will have a lower priority (reducing its throughput and coming back to the common throughput level) and when one of them decreases its throughput it will have higher priority (increasing its throughput and coming back to the common throughput level).

Yet another possibility is to consider the priority of a UE as the ratio between achievable data rate at the current TTI for UE u, $R_u$, and the UE's throughput, i.e., $$P_u(R_u, t_u) = \frac{R_u}{t_u},$$

in order to achieve proportional fairness among UEs. Thus, according to the proportional fair principle, the relative throughput values of all UEs are kept similar to each other, where relative throughput is the ratio between the instantaneous throughput and its long-term average. That is, in a proportionally fair system, UE throughputs may be different, but no UE is 'starved' of throughput. Thus, proportional fairness is a compromise-based scheduling algorithm. It is based upon maintaining a balance between two competing interests: trying to be fair (allowing all UEs to achieve at least a minimal level of service by prioritising the ones with lowest throughput $t_u$) but also prioritizing the UEs with really good channel quality (the ones with high data rate $R_u$ at the current TTI).

Once the highest priority UE is identified in step 903, in step 904 the amount of resources $r_u$ that UE u needs to be satisfied is estimated. A resource is a combination of a frequency channel(s) or subcarrier(s) and one or more time slots. That is, a resource is a time-frequency opportunity allocated for the UE to transmit information symbols. A resource can be considered to be smallest unit that can be scheduled for a UE. The amount of resources can be estimated based on the minimum amount of resources that guarantees that one or more satisfaction criteria are met, for a current or next transmission time interval (TTI). In one exemplary criterion, a UE is satisfied if the UE's throughput $t_u$ is above a given target $T_u$, i.e., $t_u \geq T_u$, for throughput-based data services. In another exemplary criterion, the UE is satisfied if the head-of-line packet delay is below a given target for time-sensitive data services. More generally, a 'satisfied UE' is a UE whose allocated resources over a time period are sufficient to maintain a predefined throughput or quality of service over that time period. A UE that is not satisfied will still need to transmit or receive data, and so further resources would need to be scheduled to allow the UE to transmit the rest of the data, or to receive the rest of the data buffered at the base station.

Any UEs paired with UE u will receive at most a total of $r_a$ resources, where $r_a$ is set, in step 905, to be either equal to $r_u$, if $r_u \leq R$, or equal to R, if $r_u > R$, where R is the total amount of resources available in the base station to be scheduled. In other words, the number of resources $r_a$ that a UE paired with UE u can be allocated is set equal to $r_u$ or R, whichever is smaller. Initially, when no transmissions by the UEs or base station are scheduled, R is the total amount of resources available for data transmission in the coverage area of the cell using the allocated spectrum resources. Thus, the initial value of R is predetermined, for example during deployment of the base station/cell, and is equal to the ratio between the total available frequency bandwidth and the size of a resource in term of how much frequency bandwidth it occupies. As noted below with reference to step 917, during the scheduling procedure resources are scheduled for UEs, and the value of R is updated according to the amount of resources that have been scheduled. In that case, after the first occurrence of step 917, the value of R represents the remaining amount of resources available for data transmission.

In step 906, it is determined whether UE u is a UE that has data to receive from the base station. In other words, it is determined whether UE u is part of set $\mathcal{D}$. If UE u is part of set $\mathcal{D}$, the method proceeds to step 907*a*. If UE u is not part of set $\mathcal{D}$ (i.e. it is part of set $\mathcal{U}$) the method proceeds to step 907*b*. In steps 907*a* and 907*b*, a set $\mathcal{S}$ is formed with the UEs that can be paired with UE u in full duplex communications.

If UE u is a DL UE, in step 907*a* $\mathcal{S}$ is determined to be the subset of UL UEs (i.e. the UEs in set $\mathcal{U}$) whose sidelink announcements were not detected by UE u. Alternatively, $\mathcal{S}$ can be determined to be the subset of UL UEs (i.e. the UEs in set $\mathcal{U}$) whose sidelink announcements were detected with a signal quality below a given threshold (e.g. the RSRP or RSRQ of the sidelink announcement was below a threshold).

If UE u is an UL UE, in step 907*b* $\mathcal{S}$ is determined to be the subset of DL UEs (i.e. the UEs in set $\mathcal{D}$) who did not detect the sidelink announcement(s). Alternatively, $\mathcal{S}$ can be determined to be the subset of DL UEs (i.e. the UEs in set $\mathcal{D}$) who detected the sidelink announcement(s) by UE u, but the signal quality of the detected announcement(s) was below a given threshold (e.g. the RSRP or RSRQ of the sidelink announcement was below a threshold). The base station can determine the value of the signal quality threshold. For example, the threshold can be set such that the SINR at the DL UE is estimated to be higher than a minimum required value for the DL UE to receive data. A similar threshold can be set with respect to the signal of the UL UE received at the base station.

At step 908, it is checked whether the set $\mathcal{S}$ is empty. If set $\mathcal{S}$ is empty, then no UE was found that can be scheduled with UE u for a full duplex transmission without the data transmission by one of the UEs interfering with the data reception by the other UE. Thus, if set $\mathcal{S}$ is empty, since UE u is the one with the highest priority, it will be scheduled for a half duplex transmission (step 909). The method then proceeds to step 917.

If it is determined at step 908 that set $\mathcal{S}$ is not empty, then in step 910 the UE p within $\mathcal{S}$ that has the highest priority will be chosen to be paired with UE u. The highest priority UE within $\mathcal{S}$ can be determined using the priorities determined in step 903.

Next, in step 911, for UE p, the base station estimates the amount of resources $r_p$ that this UE needs to be satisfied. Step 911 can be performed in a similar way to step 904 for UE u.

In step 912 it is determined whether the amount of resources $r_p$ required by UE p is higher than the amount of resources $r_a$ available to be scheduled for UEs paired with UE u.

If $r_p$ is lower than or equal to $r_a$ then in step 913 $r_p$ resources are scheduled for the full duplex communication for the paired UEs u and p. If $r_p$ is lower than $r_a$, there will still be some resources to be assigned to UE u (i.e. the residual of $r_a$) that can be used for full duplex communications with another UE.

The scheduling of $r_p$ resources in step 913 can be performed in different ways.

In one approach, the resources can be scheduled in descending order of $$\min\left(CQI^r_{UL\_UE-BS}, CQI^r_{DL\_UE-BS}\right),$$

where $$CQI^r_{UL\_UE-BS}$$

is the CQI of the link between the UL UE and the base station at resource r and $$CQI^r_{DL\_UE-BS}$$

is the CQI of the link between the DL UE and the base station at resource r. Thus, for the available resources r, the $$\min\left(CQI^r_{UL\_UE-BS}, CQI^r_{DL\_UE-BS}\right)$$

is determined. The resource r with the highest value of $$\min\left(CQI^r_{UL\_UE-BS}, CQI^r_{DL\_UE-BS}\right)$$

will be scheduled for the full duplex communication with the UL UE and the DL UE. In other words, resources are scheduled or selected that have a relatively good quality between the DL UE and the base station, and also between the UL UE and the base station. This is the opposite to scheduling when direct sidelink pairings are to be performed.

In another approach, the resources can be scheduled in descending order of CQIs for the link between the UL UE in the pair and the base station $$\left(\text{denoted } CQI^r_{UL\_UE-BS}\right).$$

Thus, for the available resources r, the $$CQI^r_{UL\_UE-BS}$$

is determined. The resource r with the highest value of $$CQI^r_{UL\_UE-BS}$$

will be scheduled for the full duplex communication with the UL UE and the DL UE. In this approach, the main aim is to prioritise the link between the base station and the UL UE (i.e. the uplink), as this is in general weaker than downlink and, therefore, tends to provide the bottleneck in the system.

In another approach, if the CQI information about the link between the UL and DL UEs is available at the granularity of resources (e.g. if CQI is available per resource), the resources can be scheduled in ascending order of the CQI of the link between the UL and DL UEs. In other words, the $r_p$ resources with the lowest CQI (e.g. highest path loss) between the UL UE and the DL UE are scheduled for the full duplex communications. Therefore this approach selects the resources with the highest level of separation between the UEs. This is opposite to the scheduling that would be performed for scheduling direct sidelink communications.

In step 914 the values of $r_a$ and $r_u$ are updated to account for the $r_p$ resources that have been scheduled according to step 913. Therefore, $r_p$ is subtracted from both $r_a$ and $r_u$ to give the updated values of $r_a$ and $r_u$.

In step 915 UE p is removed from set S and removed from the relevant one of $\mathcal{U}$ and D.

The method then returns to step 908 and repeats using the updated values of $r_a$ and $r_u$, and the updated set $\mathcal{S}$. The repetition of step 908 onwards aims to schedule some or all of the remaining resources $r_a$ for UE u in a full duplex communication with another UE in the set $\mathcal{S}$, or, if set $\mathcal{S}$ is empty, schedule the remaining resources $r_a$ for UE u as a half duplex communication (step 909).

If at step 912 $r_p$ is higher than $r_a$ then in step 916 $r_a$ resources are scheduled for the full duplex communication for the paired UEs u and p. The scheduling of $r_a$ resources in step 916 can be performed in different ways.

In one approach, the resources can be scheduled in descending order of $$\min\left(CQI^r_{UL\_UE-BS}, CQI^r_{DL\_UE-BS}\right),$$

where $$CQI^r_{UL\_UE-BS}$$

is the CQI of the link between the UL UE and the base station at resource r and $$CQI^r_{DL\_UE-BS}$$

is the CQI of the link between the DL UE and the base station at resource r. Thus, for the available resources r, the $$\min\left(CQI^r_{UL\_UE-BS}, CQI^r_{DL\_UE-BS}\right)$$

is determined. The resource r with the highest value of $$\min\left(CQI^r_{UL\_UE-BS}, CQI^r_{DL\_UE-BS}\right)$$

will be scheduled for the full duplex communication with the UL UE and the DL UE. In other words, resources are scheduled or selected that have a relatively good quality between the DL UE and the base station, and also between the UL UE and the base station. This is the opposite to scheduling when direct sidelink pairings are to be performed.

In another approach, the resources can be scheduled in descending order of CQIs for the link between the UL UE in the pair and the base station $$(\text{denoted } CQI^{r}_{UL\_UE-BS}).$$

Thus, for the available resources r, the $$CQI^{r}_{UL\_UE-BS}$$

is determined. The resource r with the highest value of $$CQI^{r}_{UL\_UE-BS}$$

will be scheduled for the full duplex communication with the UL UE and the DL UE. In this approach, the main aim is to prioritise the link between the base station and the UL UE (i.e. the uplink), as this is in general weaker than downlink and, therefore, tends to provide the bottleneck in the system.

In another approach, if the CQI information about the link between the UL and DL UEs is available at the granularity of resources (e.g. if CQI is available per resource), the resources can be scheduled in ascending order of the CQI of the link between the UL and DL UEs. In other words, the $r_p$ resources with the lowest CQI between the UL UE and the DL UE are scheduled for the full duplex communications. Therefore this approach selects the resources with the highest level of separation between the UEs. This is opposite to the scheduling that would be performed for scheduling direct sidelink communications.

In step 917, which occurs either after the resources are scheduled in step 916, or after step 909 (in which resources are assigned for a half duplex communication mode), the values of R and $r_u$ are updated to account for the $r_a$ resources that have been scheduled according to step 916. Therefore, $r_a$ is subtracted from both R and $r_u$ to give the updated values of R and $r_u$.

In step 918, it is determined whether there are still resources available for full duplex communications and/or half duplex communications. Thus, in step 918 it is determined whether the updated value of R is greater than 0.

If R is greater than 0, then UE u will have received the $r_u$ resources it needs to be satisfied, and there will still be resources (R>0) for full duplex communications and/or half duplex communications. In this case, in step 919 UE u is removed from set $\mathcal{U}$ or $\mathcal{D}$, as appropriate, and the method returns to step 902. Step 902 onwards then repeats using the updated value of R, and the updated set $\mathcal{U}$ or $\mathcal{D}$, as appropriate.

If at step 918 R is not greater than 0, then all resources available for full duplex communications and/or half duplex communications have been scheduled, and the process will finish.

After the scheduling of resources using the method in FIG. 9, the relevant UEs can be informed of the resources scheduled for their data transmission or reception, and the full duplex communications (and any half duplex communications) can be performed.

Figure 10:
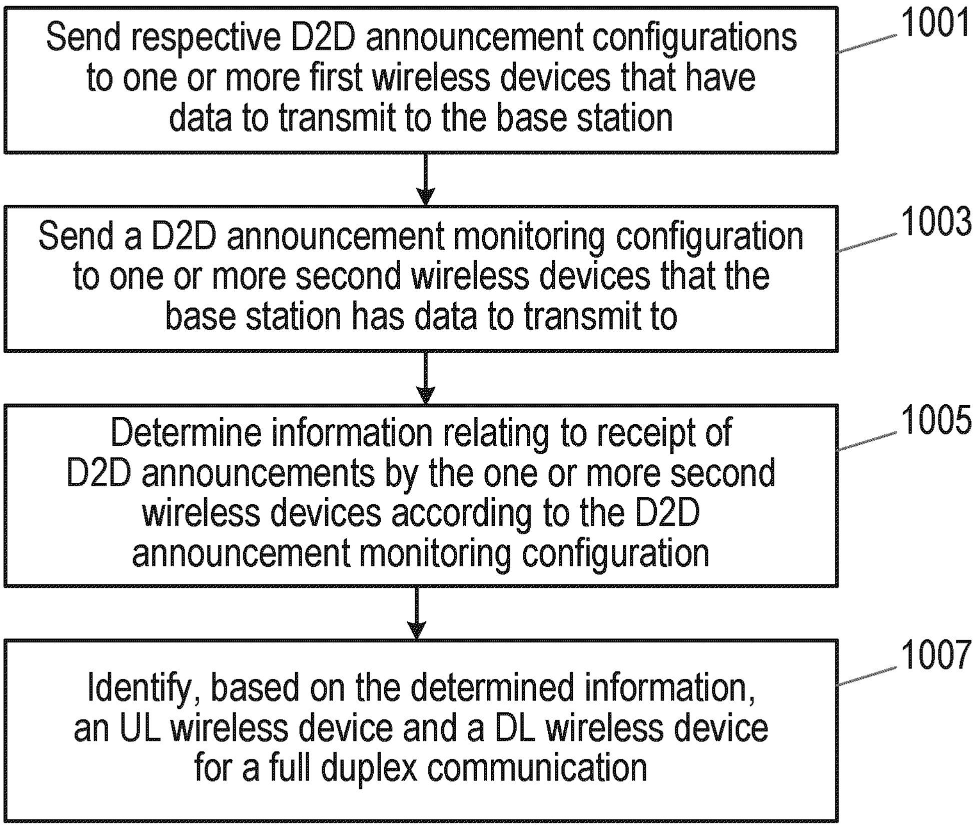
FIG. 10 shows a method in a base station that is to operate in a full duplex communication mode according to the techniques described herein.

The flow chart in FIG. 10 shows a method in a base station that is to operate in a full duplex communication mode according to the techniques described herein. The method can be implemented by the base station 500 shown in FIG. 5, or by the virtualization environment 600 shown in FIG. 6. In some embodiments, the method can be embodied as computer readable code that can be executed by a suitable computer, server, processor or processing circuitry to cause the described method to be performed.

Although not shown in FIG. 10, the method can start with the base station receiving a transmission request from one or more wireless devices. The transmission request indicates that the wireless device has data to transmit to the base station. This wireless device, and any other wireless device that sends a transmission request or otherwise indicates that it has data to transmit to the base station is referred to as a 'first wireless device'.

In step 1001, the base station sends respective D2D announcement configurations to one or more first wireless devices (e.g. wireless devices from which a transmission request has been received). The D2D announcement configuration configures a first wireless device to perform a respective D2D announcement. Step 1001 can be performed in a similar way to step 812 in FIG. 8.

The D2D announcement configuration for a particular first wireless device can comprise any one or more of: a transmission power to use for transmitting the D2D announcement (the transmission power may be the power that is to be used by the first wireless device to transmit data to the base station, or it may be a maximum transmission power for the first wireless device); one or more frequencies to use for transmitting the D2D announcement (these frequencies may be the frequencies available to use for the full duplex communication); a flag indicating that the first wireless device receiving the D2D announcement configuration is to transmit a D2D announcement; a wireless device identifier to be included in the D2D announcement that identifies the first wireless device transmitting the D2D announcement; a timing indication indicating a time at which to start transmitting the D2D announcement; a periodicity indication indicating how often the D2D announcement is to be transmitted by the first wireless device; and a repetition indication indicating how many times the D2D announcement is to be transmitted by the first wireless device.

In some embodiments, each D2D announcement configuration is specific to the first wireless device to which it is sent.

In step 1003, the base station sends a D2D announcement monitoring configuration to one or more second wireless devices. The second wireless devices are wireless devices that the base station has data to transmit to (e.g. the base station has data for these wireless devices stored in a buffer). The D2D announcement monitoring configuration configures a second wireless device to monitor for a D2D announcement transmitted by one or more first wireless devices. Step 1003 can be performed in a similar way to step 813 in FIG. 8.

The D2D announcement monitoring configuration can comprises any one or more of: one or more frequencies to monitor for the D2D announcement; a flag indicating that the second wireless device receiving the D2D announcement monitoring configuration is to monitor for D2D announcements; a timing indication indicating a time at which to start monitoring for D2D announcements; a respective identifier of one or more first wireless devices that are to transmit D2D announcements; and a monitoring period indication indicating a period of time in which the second wireless device is to monitor for D2D announcements.

In some embodiments, the same D2D announcement monitoring configuration is sent to each of the one or more second wireless devices. Alternatively, each D2D announcement monitoring configuration can be specific to the second wireless device to which it is sent.

In step 1005, the base station determines information relating to receipt of D2D announcements by the one or more second wireless devices according to the D2D announcement monitoring configuration. Step 1005 can be performed in a similar way to steps 814-817 in FIG. 8.

Step 1005 can comprise the base station receiving a monitoring report from at least one of the second wireless devices. The monitoring report can comprise information (e.g. measurements, or signal quality measurements) relating to receipt of D2D announcements by the second wireless device according to the D2D announcement monitoring configuration. In some embodiments, a monitoring report may only comprise information on a received D2D announcement if a signal quality measurement for the received D2D announcement is above a threshold value. In some embodiments, the monitoring report can indicate if the second wireless device did not receive a D2D announcement that was expected according to its D2D announcement monitoring configuration.

In alternative embodiments, the second wireless devices may only send monitoring reports if one or more D2D announcements were received by the second wireless device. in that case, the base station can determine that the second wireless device did not receive any D2D announcements if no monitoring report is received from that second wireless device.

Next, in step 1007, the base station identifies an UL wireless device from the one or more first wireless devices and a DL wireless device from the one or more second wireless devices for a full duplex communication. The base station identifies the UL wireless device and the DL wireless device based on the information determined in step 1005. Step 1007 can be performed in a similar way to step 713 in FIG. 7 and/or steps 901-907 in FIG. 9.

In some embodiments, step 1007 comprises several substeps. Firstly, a first candidate pairing for full duplex communications is formed that comprises one of the first wireless devices and one of the second wireless devices. Next, the information determined in step 1007 for that second wireless device is used to estimate co-channel interference, CCI, at the second wireless device due transmissions by the first wireless device in the pairing to the base station. These two steps are repeated for one or more further candidate pairings of a first wireless device and a second wireless device. Based on the CCIs, the wireless devices in one of the candidate pairings is selected as the UL wireless device and the DL wireless device.

In some embodiments, step 1007 comprises selecting a first candidate from the one or more first wireless devices and the one or more second wireless devices, then determining a set of pairing candidates for the first candidate, and selecting the UL wireless device and the DL wireless device as the first candidate and one of the pairing candidates. If the first candidate is a first wireless device, then the set of pairing candidates are determined from the one or more second wireless devices based on receipt of the D2D announcement from the first candidate. If the first candidate is a second wireless device, then the set of pairing candidates are determined from the one or more of the first wireless devices based on receipt of D2D announcements from the one or more first wireless devices. In some embodiments, the first candidate can be the wireless device in the one or more first wireless devices and the one or more second wireless devices that has a highest priority. The pairing candidate with a highest priority can be selected. In some embodiments, a priority can be determined for each of the first wireless devices and the second wireless devices, with the priority being determined based on any one or more of: a head-of-line packet delay, a wireless device throughput, a wireless device target throughput, a wireless device quality of service, and a number of neighbour wireless devices.

When determining a set of pairing candidates for the first candidate, if the first candidate is a first wireless device, the set of pairing candidates can be determined to comprise any second wireless device that did not receive the D2D announcement from the first candidate, and/or any second wireless device for which a respective signal quality measurement of the D2D announcement from the first candidate meets a criterion. Alternatively when determining a set of pairing candidates for the first candidate, if the first candidate is a second wireless device, the set of pairing candidates can be determined to comprise any first wireless device for which the first candidate did not receive the respective D2D announcement, and/or any first wireless device for which a signal quality measurement by the first candidate of the respective D2D announcement meets a criterion.

In some embodiments, the method can further include the base station sending a CQI measurement request to the one or more second wireless devices. This step can be performed in a similar way to step 821 in FIG. 8. The CQI measurement request requests the one or more second wireless devices measure a CQI of the DL from the base station. The base station can then receive respective CQI measurements of the DL from the second wireless devices.

In some embodiments, the method can further comprise the base station measuring a respective CQI of the UL from the first wireless devices.

In some embodiments, after step 1007 the base station can schedule resources for the full duplex communication with the identified UL wireless device and DL wireless device. The scheduling can be performed in a similar way to step 713 in FIG. 7 and as shown in FIG. 9.

In some embodiments, the base station can schedule resources for the full duplex communication according to any of CQI for communications from the UL wireless device to the base station; CQI for communications from the base station to the DL wireless device; and CQI for communications between the UL wireless device and the DL wireless device. A CQI may be determined or estimated for each available resource. In some embodiments, a CQI for communications between the UL wireless device and the DL wireless device may be determined or estimated from the information relating to receipt of D2D announcements by the one or more second wireless devices.

In some embodiments, the resources available for the full duplex communication can be ordered according to respective CQIs for communications from the UL wireless device to the base station and respective CQI for communications from the base station to the DL wireless device, and the N resources with the highest channel quality can be scheduled for the full duplex communication. N is the number of resources required for the full duplex communication. This embodiment relates to the scheduling of resources in descending order of $$\min\left(CQI^{r}_{UL\_UE-BS}, CQI^{r}_{DL\_UE-BS}\right)$$

as described above with reference to step 916.

In alternative embodiments, the resources available for the full duplex communication can be ordered according to respective CQIs for communications from the UL wireless device to the base station, and the N resources with the highest channel quality can be scheduled for the full duplex communication. Again, N is the number of resources required for the full duplex communication.

In other alternative embodiments, the resources available for the full duplex communication can be ordered according to respective CQIs for communications between the UL wireless device and the DL wireless device, and the N resources with the lowest channel quality are scheduled for the full duplex communication. Again, N is the number of resources required for the full duplex communication.

Following step 1007, and any scheduling steps, a full duplex communication is performed by the base station with the identified UL wireless device and the identified DL wireless device.

Figure 11:
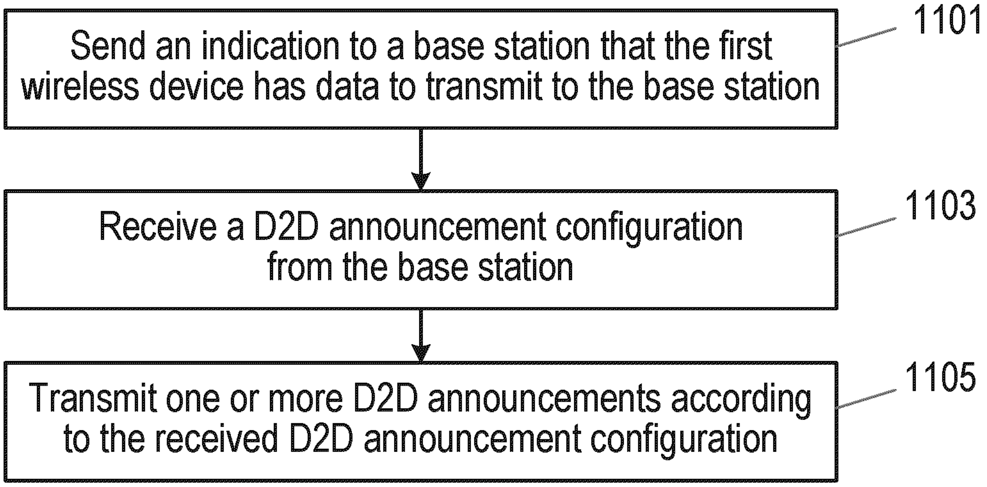
FIG. 11 shows a method in a wireless device according to the techniques described herein.

The flow chart in FIG. 11 shows a method in a wireless device (referred to as a first wireless device) according to the techniques described herein. The method can be implemented by the wireless device 400 shown in FIG. 4, or by the virtualization environment 600 shown in FIG. 6. In some embodiments, the method can be embodied as computer readable code that can be executed by a suitable computer, server, processor or processing circuitry to cause the described method to be performed.

In step 1101, the first wireless device sends an indication to the base station that the wireless device has data to transmit to the base station. The wireless device can therefore be an UL wireless device in a full duplex communication by the base station. Step 1101 can be performed in a similar way to step 811 in FIG. 8.

In step 1103, the first wireless device receives a D2D announcement configuration from the base station. The D2D announcement configuration configures the first wireless device to perform a D2D announcement. Step 1103 can be performed in a similar way to step 812 in FIG. 8 and step 1001 in FIG. 10.

In step 1105, the first wireless device transmits one or more D2D announcements according to the received D2D announcement configuration. Step 1105 can be performed in a similar way to step 814 in FIG. 8.

In some embodiments, the first wireless device can receive an indication from the base station of one or more resources that have been scheduled for the first wireless device to use to transmit data.

In some embodiments, the method further comprises the first wireless device transmitting the data to the base station.

Figure 12:
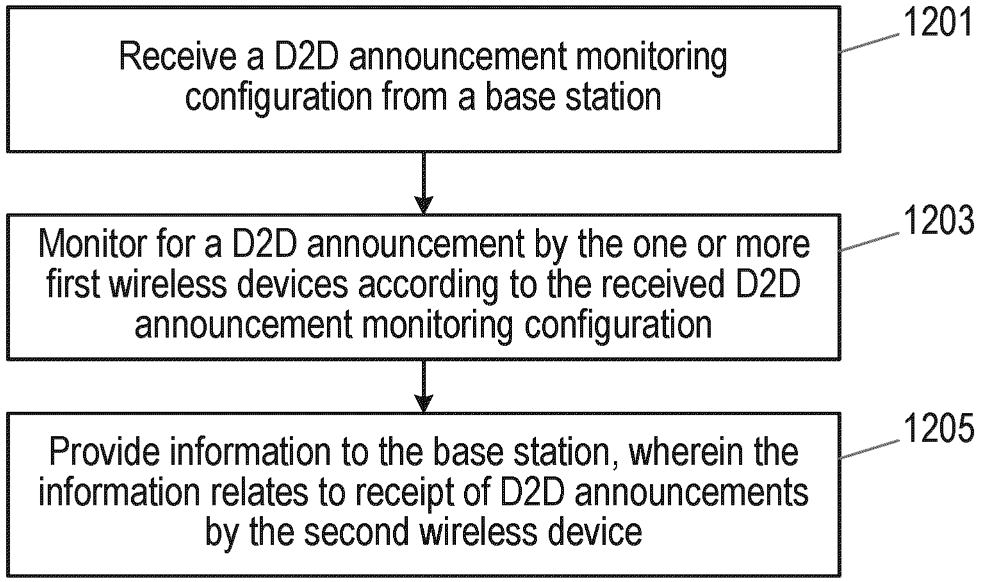
FIG. 12 shows a method in another wireless device according to the techniques described herein.

The flow chart in FIG. 12 shows a method in a wireless device (referred to as a second wireless device) according to the techniques described herein. The method can be implemented by the wireless device 400 shown in FIG. 4, or by the virtualization environment 600 shown in FIG. 6. In some embodiments, the method can be embodied as computer readable code that can be executed by a suitable computer, server, processor or processing circuitry to cause the described method to be performed.

In step 1201, a D2D announcement monitoring configuration is received from a base station. The D2D announcement monitoring configuration configures the second wireless device to monitor for a D2D announcement by one or more first wireless devices. Step 1201 can be performed in a similar way to step 813 in FIG. 8 and step 1003 in FIG. 10.

In step 1203, the second wireless device monitors for a D2D announcement by the one or more first wireless devices according to the received D2D announcement monitoring configuration. Step 1203 can be performed in a similar way to steps 815 and 816 in FIG. 8.

In step 1205, the second wireless device provides information to the base station relating to receipt of D2D announcements by the second wireless device according to the received D2D announcement monitoring configuration. Step 1205 can be performed in a similar way to step 817 in FIG. 8.

Step 1205 can comprise the second wireless device transmitting a monitoring report to the base station. The monitoring report can comprise information (e.g. measurements, or signal quality measurements) relating to receipt of D2D announcements by the second wireless device. In some embodiments, a monitoring report may only comprise information on a received D2D announcement if a signal quality measurement for the received D2D announcement is above a threshold value. In some embodiments, the monitoring report can indicate if the second wireless device did not receive a D2D announcement that was expected according to its D2D announcement monitoring configuration. In alternative embodiments, if the second wireless devices did not receive the D2D announcement(s), the second wireless device may refrain from sending a monitoring report to the base station. The absence of the monitoring report will indicate to the base station that the second wireless device did not receive the D2D announcements.

In some embodiments, step 1205 is performed on expiry of a timer. Alternatively, step 1205 can be performed once a predetermined number of D2D announcements have been received by the second wireless device.

In some embodiments, the method can further include the second wireless device receiving a CQI measurement request from the base station. The CQI measurement request requests the second wireless device measure a CQI of the DL from the base station. The second wireless device can measure the CQI of the DL from the base station and transmit CQI measurements of the DL to the base station.

In some embodiments, the second wireless device can receive an indication from the base station of one or more resources that have been scheduled in which the base station will transmit data to the second wireless device.

In some embodiments, the method further comprises receiving the data from the base station.

Figure 13:
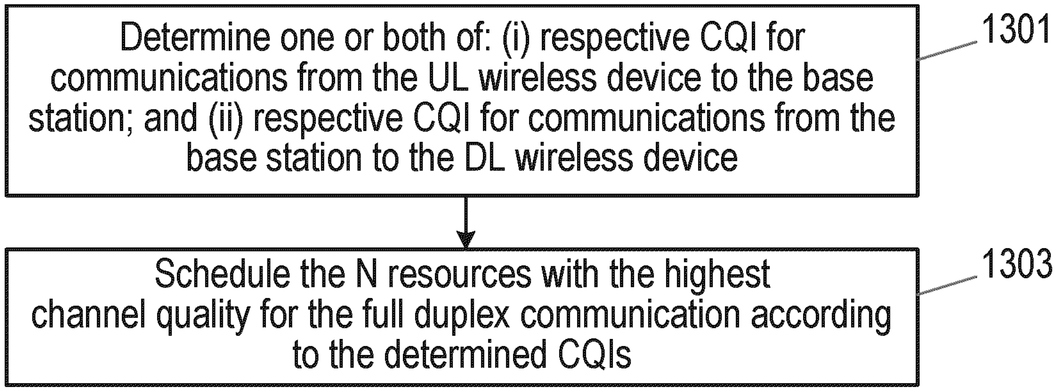
FIG. 13 shows a method in a base station for scheduling resources for a full duplex communication mode according to the techniques described herein.

The flow chart in FIG. 13 shows a method in a base station for scheduling resources for a full duplex communication mode according to the techniques described herein. An UL wireless device and a DL wireless device have been identified that are to participate in the full duplex communication. The method can be implemented by the base station 500 shown in FIG. 5, or by the virtualization environment 600 shown in FIG. 6. In some embodiments, the method can be embodied as computer readable code that can be executed by a suitable computer, server, processor or processing circuitry to cause the described method to be performed.

In step 1301 the base station determines one or both of a respective CQI for communications from an UL wireless device to the base station for a plurality of available resources; and CQI for communications from the base station to a DL wireless device for the plurality of available resources.

In step 1303, the base station schedules the N resources with the highest channel quality for the full duplex communication according to the determined CQIs. N is the number of resources required for the full duplex communication.

In one embodiment of step 1303, the resources are scheduled in descending order of $$\min\left(CQI^r_{UL\_UE-BS}, CQI^r_{DL\_UE-BS}\right).$$

That is, for the available resources r, the $$\min\left(CQI^r_{UL\_UE-BS}, CQI^r_{DL\_UE-BS}\right)$$

is determined for the UL wireless device and the DL wireless device, and the resource r with the highest value of $$\min\left(CQI^r_{UL\_UE-BS}, CQI^r_{DL\_UE-BS}\right)$$

is scheduled for the full duplex communication.

In another embodiment of step 1303, the resources can be scheduled in descending order of CQIs for communications from the UL wireless device to the base station. That is, for the available resources r, the $$CQI^r_{UL\_UE-BS}$$

is determined, and the resource r with the highest value of $$CQI^r_{UL\_UE-BS}$$

is scheduled for the full duplex communication.

Therefore there is described improved techniques for the pairing of wireless devices for full duplex communications by a base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method in a base station that is to operate in a full duplex communication mode, the method comprising:

sending respective device-to-device (D2D) announcement configurations to one or more first wireless devices that have data to transmit to the base station, a D2D announcement configuration requesting a first wireless device to announce to other nearby wireless devices that the first wireless device is available for D2D communication;

sending a D2D announcement monitoring configuration to one or more second wireless devices that are to receive data from the base station, the D2D announcement monitoring configuration to cause a second wireless device to monitor for a D2D announcement transmitted by the one or more first wireless devices;

receiving information relating to receipt of D2D announcements by the one or more second wireless devices according to detection of the D2D announcement monitoring configuration by the one or more first wireless devices; and identifying, based on the detection information, an uplink (UL) wireless device from the one or more first wireless devices and a downlink (DL) wireless device from the one or more second wireless devices for a full duplex communication in which the UL wireless device is to transmit data to the base station and the base station is to transmit data to the DL wireless device without interference at a same time.

2. The method as claimed in claim 1, wherein the method further comprises:

receiving a respective transmission request from one or more wireless devices, wherein the transmission request indicates that the wireless device has data to transmit to the base station; and wherein the D2D announcement configuration is sent to wireless devices from which a respective transmission request has been received.

3. The method as claimed in claim 1, wherein each D2D announcement configuration is specific to the first wireless device to which it is sent.

4. The method as claimed in claim 1, wherein the same D2D announcement monitoring configuration is sent to each of the one or more second wireless devices.

5. The method as claimed in claim 1, wherein the step of identifying comprises:

(i) forming a first candidate pairing for full duplex communications comprising one of the first wireless devices and one of the second wireless devices;

(ii) using the determined information for the second wireless device in the first candidate pairing to estimate co-channel interference (CCI) at the second wireless device in the first candidate pairing due transmissions by the first wireless device in the first candidate pairing to the base station;

(iii) repeating steps (i) and (ii) for one or more further candidate pairings of a first wireless device and a second wireless device; and (iv) selecting the wireless devices in one of the candidate pairings as the UL wireless device and the DL wireless device based on the estimated CCI.

6. The method as claimed in claim 1, wherein the step of identifying comprises:

selecting a first candidate from the one or more first wireless devices and the one or more second wireless devices;

determining a set of pairing candidates for the first candidate, wherein if the first candidate is a first wireless device, the set of pairing candidates are determined from the one or more second wireless devices based on receipt of the D2D announcement from the first candidate, and wherein if the first candidate is a second wireless device, the set of pairing candidates are determined from the one or more of the first wireless devices based on receipt of D2D announcements from the one or more first wireless devices; and selecting the UL wireless device and the DL wireless device as the first candidate and one of the pairing candidates.

7. The method as claimed in claim 1, wherein the method further comprises:

sending a channel quality indicator (CQI) measurement request to the one or more second wireless devices, wherein the CQI measurement request requests the one or more second wireless devices measure a CQI of the DL from the base station; and receiving, from one or more second wireless devices, respective CQI measurements of the DL from the base station.

8. A method in a first wireless device, the method comprising:

sending an indication to a base station that the first wireless device has data to transmit to the base station;

receiving a device-to-device (D2D) announcement configuration from the base station, the D2D announcement configuration requesting the first wireless device to announce to other nearby wireless devices that the first wireless device is available for D2D communication; and transmitting, without interference at a same time, one or more D2D announcements according to the received D2D announcement configuration.

9. The method as claimed in claim 8, wherein the D2D announcement configuration comprises one or more of:

a transmission power to use for transmitting the D2D announcement;

one or more frequencies to use for transmitting the D2D announcement;

a flag indicating that the first wireless device receiving the D2D announcement configuration is to transmit a D2D announcement;

a wireless device identifier to be included in the D2D announcement that identifies the first wireless device transmitting the D2D announcement;

a timing indication indicating a time at which to start transmitting a D2D announcement;

a periodicity indication indicating how often the D2D announcement is to be transmitted by the first wireless device; and a repetition indication indicating how many times the D2D announcement is to be transmitted by the first wireless device.

10. A method in a second wireless device, the method comprising:

receiving a device-to-device (D2D) announcement monitoring configuration from a base station, the D2D announcement monitoring configuration requesting the second wireless device to monitor for a D2D announcement by one or more first wireless devices;

monitoring for a D2D announcement by the one or more first wireless devices according to the received D2D announcement monitoring configuration; and providing information to the base station, wherein the information relates to receipt of D2D announcements by the second wireless device according to detection of the received D2D announcement monitoring configuration by the one or more wireless devices.

11. The method as claimed in claim 10, wherein the information provided to the base station is a monitoring report comprising measurements of D2D announcements received by the second wireless device.

12. The method as claimed in claim 11, wherein the monitoring report comprises signal quality measurements of the D2D announcements received by the second wireless device.

13. The method as claimed in claim 11, wherein the monitoring report comprises signal quality measurements of D2D announcements received by the second wireless device where the signal quality is higher than a threshold value.

14. A method in a base station to operate in a full duplex communication mode, the method comprising:

scheduling resources for a full duplex communication in which an uplink (UL) wireless device is to transmit data to the base station and the base station is to transmit data to a downlink (DL) wireless device without interference at a same time;

determining one or both of:

(i) respective channel quality indicator (CQI) for communications from the UL wireless device to the base station for a plurality of available resources; and (ii) CQI for communications from the base station to the DL wireless device for the plurality of available resources; and scheduling the N resources with the highest channel quality for the full duplex communication according to the determined CQIs, wherein N is the number of resources required for the full duplex communication.

15. A base station that is to operate in a full duplex communication mode, the base station comprising a processor and a memory, said memory containing instructions executable by said processor whereby said base station is operative to:

send respective device-to-device (D2D) announcement configurations to one or more first wireless devices that have data to transmit to the base station, a D2D announcement configuration requesting a first wireless device to announce to other nearby wireless devices that the first wireless device is available for D2D communication;

send a D2D announcement monitoring configuration to one or more second wireless devices that are to receive data from the base station, the D2D announcement monitoring configuration to cause a second wireless device to monitor for a D2D announcement transmitted by the one or more first wireless devices;

receive information relating to receipt of D2D announcements by the one or more second wireless devices according to detection of the D2D announcement monitoring configuration by the one or more first wireless devices; and identify, based on the detection information, an uplink (UL) wireless device from the one or more first wireless devices and a downlink (DL) wireless device from the one or more second wireless devices for a full duplex communication in which the UL wireless device is to transmit data to the base station and the base station is to transmit data to the DL wireless device without interference at a same time.

16. The base station as claimed in claim 15, wherein the base station is further operative to:

receive a respective transmission request from one or more wireless devices, wherein the transmission request indicates that the wireless device has data to transmit to the base station; and wherein the D2D announcement configuration is sent to wireless devices from which a respective transmission request has been received.

17. The base station as claimed in claim 15, wherein the base station is operative to determine information by:

receiving a monitoring report from at least one of the second wireless devices, wherein a monitoring report received from a second wireless device comprises information relating to receipt of D2D announcements by the second wireless device according to the D2D announcement monitoring configuration.

18. The base station as claimed in claim 15, wherein the base station is operative to schedule by:

ordering available resources for the full duplex communication according to respective channel quality indicator (CQI) for communications from the UL wireless device to the base station and respective CQI for communications from the base station to the DL wireless device; and scheduling the N resources with the highest channel quality for the full duplex communication, wherein N is the number of resources required for the full duplex communication.

19. A first wireless device, wherein the first wireless device comprises a processor and a memory, said memory containing instructions executable by said processor whereby said first wireless device is operative to:

send an indication to a base station that the first wireless device has data to transmit to the base station;

receive a device-to-device (D2D) announcement configuration from the base station, wherein the D2D announcement configuration to request the first wireless device to announce to other nearby wireless devices that the first wireless device is available for D2D communication; and transmit, without interference at a same time, one or more D2D announcements according to the received D2D announcement configuration.

20. The first wireless device as claimed in claim 19, wherein the D2D announcement configuration comprises one or more of:

a transmission power to use for transmitting the D2D announcement;

one or more frequencies to use for transmitting the D2D announcement;

a flag indicating that the first wireless device receiving the D2D announcement configuration is to transmit a D2D announcement;

a wireless device identifier to be included in the D2D announcement that identifies the first wireless device transmitting the D2D announcement;

a timing indication indicating a time at which to start transmitting a D2D announcement;

a periodicity indication indicating how often the D2D announcement is to be transmitted by the first wireless device; and a repetition indication indicating how many times the D2D announcement is to be transmitted by the first wireless device.

21. The first wireless device as claimed in claim 20, wherein the one or more frequencies to use for transmitting the D2D announcements are frequencies that are available for the first wireless device to use to transmit the data to the base station.

22. A second wireless device, wherein the second wireless device comprises a processor and a memory, said memory containing instructions executable by said processor whereby said second wireless device is operative to:

receive a device-to-device (D2D) announcement monitoring configuration from a base station, wherein the D2D announcement monitoring configuration configures the second wireless device to monitor for a D2D announcement by one or more first wireless devices;

monitor for a D2D announcement by the one or more first wireless devices according to the received D2D announcement monitoring configuration by the one or more first wireless devices; and provide information to the base station, wherein the information relates to receipt of D2D announcements by the second wireless device according to detection of the received D2D announcement monitoring configuration by the one or more first wireless devices.

* * * * *